United States Patent
Ji et al.

(10) Patent No.: US 11,094,324 B2
(45) Date of Patent: Aug. 17, 2021

(54) ACCUMULATIVE MULTI-CUE ACTIVATION OF DOMAIN-SPECIFIC AUTOMATIC SPEECH RECOGNITION ENGINE

(71) Applicant: MOTOROLA MOBILITY LLC, Chicago, IL (US)

(72) Inventors: Zhengping Ji, Hinsdale, IL (US); Leo S. Woiceshyn, Chicago, IL (US); Karthik Mohan Kumar, Chicago, IL (US); Yi Wu, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 203 days.

(21) Appl. No.: 16/412,333

(22) Filed: May 14, 2019

(65) Prior Publication Data
US 2020/0365148 A1    Nov. 19, 2020

(51) Int. Cl.
| | |
|---|---|
| *G10L 15/22* | (2006.01) |
| *G10L 15/30* | (2013.01) |
| *G10L 15/08* | (2006.01) |

(52) U.S. Cl.
CPC .............. *G10L 15/22* (2013.01); *G10L 15/08* (2013.01); *G10L 15/30* (2013.01); *G10L 2015/088* (2013.01); *G10L 2015/223* (2013.01)

(58) Field of Classification Search
USPC .................................................. 704/1–504
See application file for complete search history.

(56) References Cited

U.S. PATENT DOCUMENTS

| | | | | |
|---|---|---|---|---|
| 9,697,828 | B1* | 7/2017 | Prasad | G10L 15/08 |
| 9,805,714 | B2* | 10/2017 | Pandya | G10L 21/0208 |
| 10,282,354 | B2* | 5/2019 | Lee | G06F 16/24578 |
| 10,373,075 | B2* | 8/2019 | Wu | G06Q 30/0201 |
| 10,388,272 | B1* | 8/2019 | Thomson | G10L 15/063 |
| 10,430,477 | B2* | 10/2019 | Lee | H04L 67/306 |
| 10,573,312 | B1* | 2/2020 | Thomson | G10L 15/26 |
| 10,832,662 | B2* | 11/2020 | Prasad | G10L 15/08 |

(Continued)

OTHER PUBLICATIONS

Chen, Guoguo et al., "Small-Footprint Keyword Spotting Using Deep Neural Networks", IEEE International Conference on Acoustics, Speech and Signal Processing (ICASSP), 2014.

(Continued)

*Primary Examiner* — Marcus T Riley
(74) *Attorney, Agent, or Firm* — Isidore PLLC

(57) ABSTRACT

A method includes detecting a keyword within an audio stream. The keyword is one of multiple keywords in a database, in which each of the multiple keywords relates to at least one of multiple domains in the database. The database stores a first confidence weight for each of the multiple keywords that are related to a first domain among the multiple domains. Each first confidence weight indicates a probability that a corresponding keyword relates to the first domain. The method includes determining whether a first confidence weight of the keyword is at least equal to an activation threshold value associated with the first domain. The method includes, in response to the first confidence weight of the keyword meeting the activation threshold value, activating a DS-ASR engine corresponding with the first domain to perform speech-to-text conversion on the audio stream.

20 Claims, 9 Drawing Sheets

(56) References Cited

U.S. PATENT DOCUMENTS

| | | | | |
|---|---|---|---|---|
| 2014/0222807 A1* | 8/2014 | Lee | ................... | H04L 63/105 |
| | | | | 707/732 |
| 2014/0222835 A1* | 8/2014 | Lee | ................... | G06F 16/951 |
| | | | | 707/748 |
| 2016/0378825 A1* | 12/2016 | Lee | ................ | G06F 16/90335 |
| | | | | 707/768 |
| 2017/0133038 A1* | 5/2017 | Jiang | ................... | G10L 15/187 |
| 2017/0278512 A1* | 9/2017 | Pandya | ............... | G10L 15/08 |
| 2017/0364596 A1* | 12/2017 | Wu | ................. | G06Q 30/0205 |
| 2018/0012593 A1* | 1/2018 | Prasad | ................ | G10L 15/08 |
| 2018/0315428 A1* | 11/2018 | Johnson | .............. | G10L 15/01 |
| 2020/0175961 A1* | 6/2020 | Thomson | ............ | G10L 15/063 |
| 2020/0365148 A1* | 11/2020 | Ji | ........................ | G10L 15/30 |

OTHER PUBLICATIONS

Hwang, Kyuyeon et al., "Online Keyword Spotting with a Character-Level Recurrent Neural Network", arXiv: 1512, 08903v1, [cs.CL] Dec. 2015.

\* cited by examiner

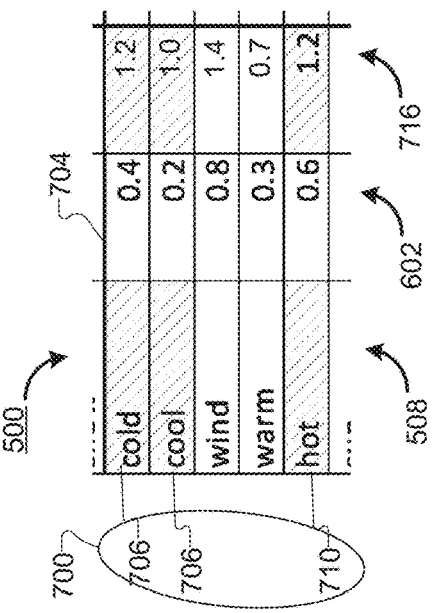
FIG. 7B
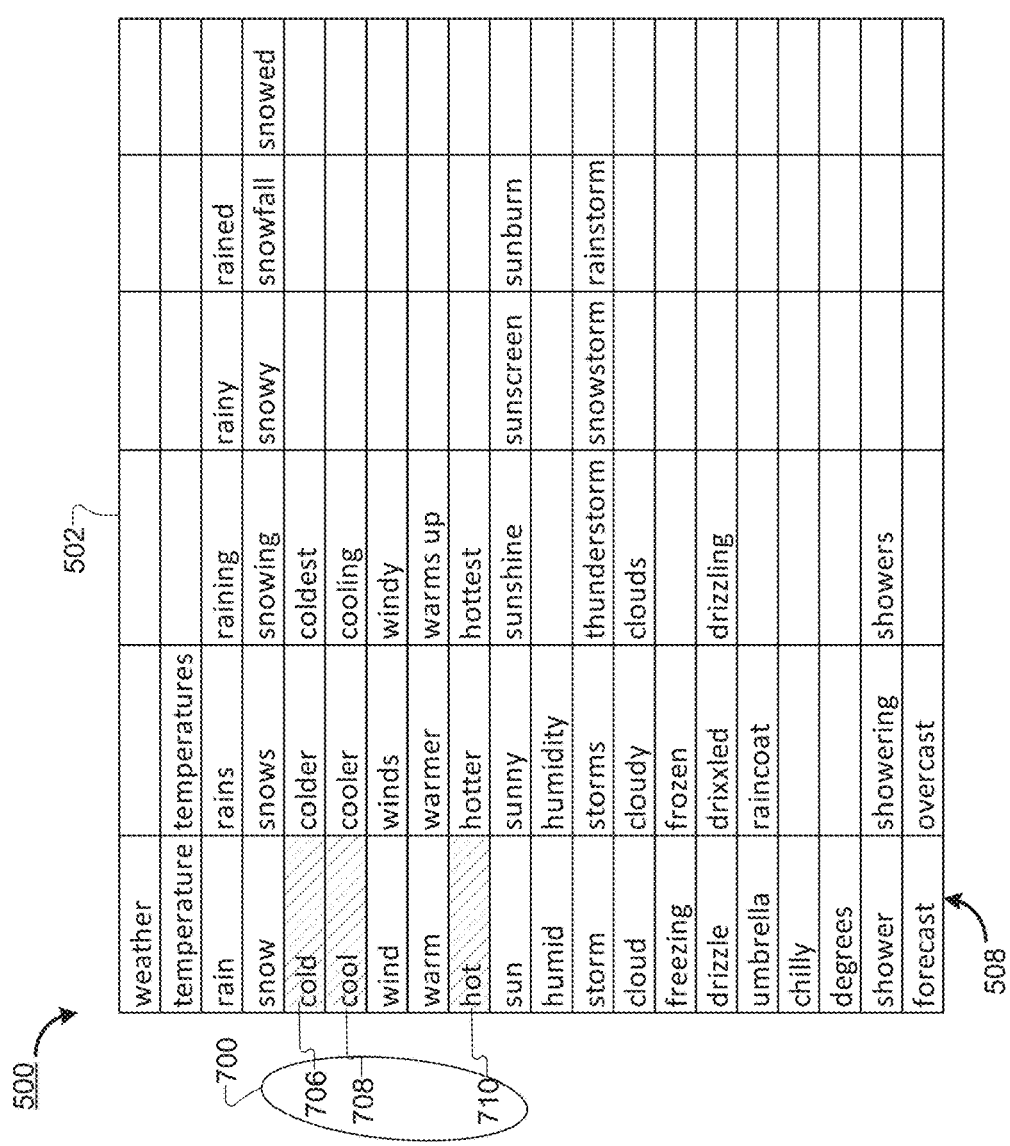
FIG. 7C
FIG. 7A

ACCUMULATIVE MULTI-CUE ACTIVATION OF DOMAIN-SPECIFIC AUTOMATIC SPEECH RECOGNITION ENGINE

BACKGROUND

1. Technical Field

The present disclosure generally relates to electronic devices with voice signal processing, and more particularly to voice signal processing within electronic devices.

2. Description of the Related Art

Mobile devices, such as smart phones, tablets, laptops or other electronic devices, are being designed with automatic speech recognition (ASR) engines that enable or support applications, such as a virtual assistant (VA). A VA is a software application that understands natural language and completes electronic tasks in response to user voice inputs, providing the user with hands free voice control of the device. For example, virtual assistants can take dictation, read a text message or an e-mail message, look up phone numbers, place calls, and generate reminders. Existing VA applications typically require a wake-up word (also referred to as a trigger word or trigger phrase), whereby all requests start with a fixed set of command words in a command/control model for use by a full, general-purpose ASR engine.

The command/control model of the full ASR engine allow listening and processing of speech input in the form of command words only after the wake-up word has been recognized. In other words, existing battery-powered mobile devices will not activate the full ASR if a user forgets to say the wake-up word before saying a command, even if the command includes wake-up words.

A full ASR engine has the ability to detect general speech in natural language. However, the full ASR engine has a very large memory footprint and utilizes a high number of processing cycles that consumes a significant amount of power. To run a full ASR engine constantly on a battery-powered mobile device would result in accelerated current drain and shorter battery discharge cycle (namely, the period of time to discharge a fully charged battery by use of the device).

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7A illustrates a selection of keywords that are selected from weather-related keywords within the database of FIG. 5 and are able to be paired with a weather-related context word, in accordance with one or more embodiments of this disclosure;

FIG. 7B illustrates an example table of weather-related context words and correlating weather-domain confidence weights, in accordance with one or more embodiments of this disclosure;

FIG. 7C illustrates an example table of enhanced confidence weights assigned to the selection of keywords of FIG. 7A based on being paired with any weather-related context word of FIG. 7B, in accordance with one or more embodiments of this disclosure;

DETAILED DESCRIPTION

Figure 1:
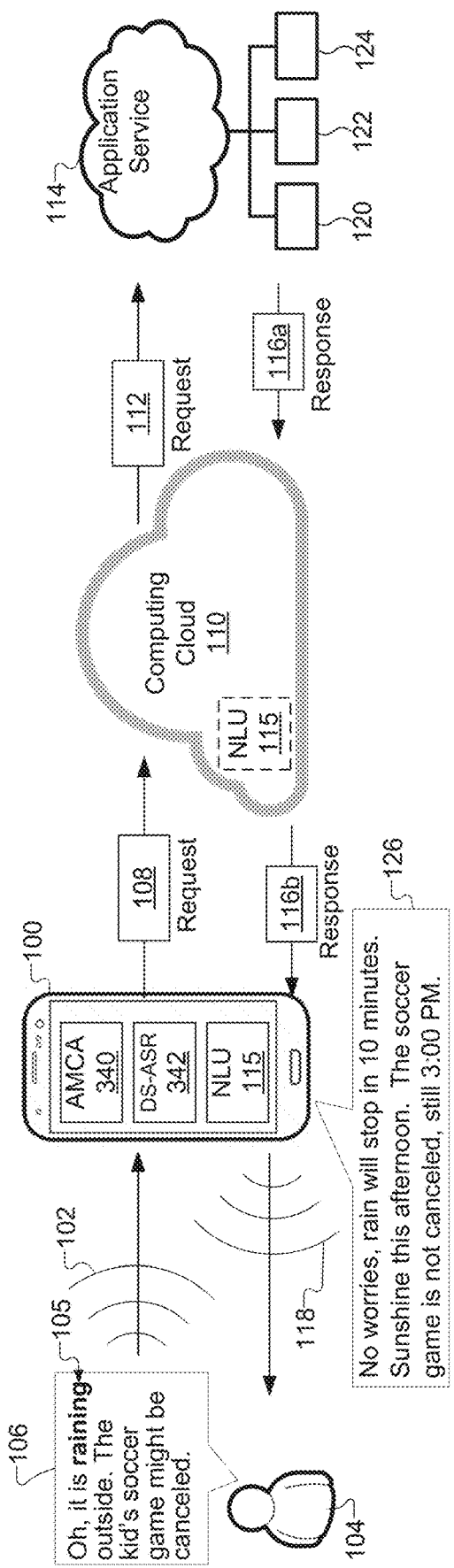
FIG. 1 illustrates an example system in which an electronic device implements an accumulative multi-cue activation (AMCA) process to selectively activate a domain-specific automatic speech recognition (DS-ASR) engine, in accordance with one or more embodiments of this disclosure.

Disclosed are a method, an electronic device, and a computer program product for operating an accumulative multi-cue activation (AMCA) module. The method includes receiving an audio stream from a microphone of an electronic device. The method includes detecting a first keyword within the audio stream. The first keyword matches a keyword stored in a database that comprises multiple keywords related to at least one of multiple domains stored in the database. The database also stores a first confidence weight for each of the multiple keywords that are related to a first domain among the multiple domains. In the database, each first confidence weight indicates a probability that a corresponding keyword relates to the first domain. Each domain to which the keyword correlates may have a different confidence weight assigned to the keyword within the database. The method includes identifying, in the database, a first confidence weight of the first keyword. The method includes determining, by a processor, whether the first confidence weight of the first keyword is at least equal to an activation threshold value associated with the first domain. The method includes, in response to determining that the first confidence weight of the first keyword is at least equal to the activation threshold value, activating a domain-specific automatic speech recognition (DS-ASR) engine corresponding to the first domain to perform speech-to-text conversion on the audio stream. The activating may include sending a domain-specific activation signal. The DS-ASR engine is specific to (i.e., trained on a corpus of words related to) the first domain.

According to one aspect, the method also includes, in response to determining that the first confidence weight of the first keyword is less than the activation threshold value: buffering the audio stream over a first time window and identifying, within the first time window, whether at least one of a context word or at least one subsequent keyword is detected within the audio stream. The time window is a predetermined duration that is relative to a time of detecting the first keyword. In response to detecting a context word within the time window, the method includes identifying, in the database, an enhanced confidence weight of a pairing of the first keyword with the context word. The database stores an enhanced confidence weight for each context-paired keyword from among the multiple keywords. Each enhanced confidence weight indicates a probability that the pairing relates to a specific domain associated with the first keyword. The method includes comparing the enhanced confidence weight to the activation threshold value, and in response to determining that the enhanced confidence weight is at least equal to the activation threshold value, activating the DS-ASR engine corresponding to the first domain. In response to detecting at least one subsequent keyword, the method includes identifying, in the database, a corresponding first confidence weight of each of the at least one subsequent keyword. The method includes determining an accumulated confidence weight using the first confidence weights of the first keyword and of each of the at least one subsequent keyword and comparing the accumulated confidence weight to the activation threshold value. The method includes, in response to determining that the accumulated confidence weight is at least equal to the activation threshold value, activating the DS-ASR engine corresponding to the first domain.

According to another embodiment, an electronic device includes at least one microphone that receives an audio stream. The electronic device includes a memory storing an AMCA module. The AMCA module activates a DS-ASR engine based on a determination that the audio stream relates to a specific domain from among multiple available domains. Upon activation, the DS-ASR engine performs speech-to-text conversion on the audio stream. The electronic device also includes a processor and an output device. The processor is operably coupled to the at least one microphone, the memory, and the output device. The processor executes the AMCA module, which enables the electronic device to detect a first keyword within the received audio stream. The first keyword is a word that matches a keyword that is stored in a database having multiple keywords related to at least one of multiple domains stored in the database. The database stores a first confidence weight for each of the multiple keywords that is related to a first domain among the multiple domains. More generally, the database stores a confidence weight corresponding to a relationship between each of the multiple keywords and an identified/related domain. Each first confidence weight indicates a probability that a corresponding keyword relates to the first domain. The processor identifies, from the database, a first confidence weight of the first keyword. The processor determines whether the first confidence weight of the first keyword is at least equal to an activation threshold value. The processor, in response to determining that the first confidence weight of the first keyword is at least equal to the activation threshold value, activates the DS-ASR engine corresponding to the first domain to perform speech-to-text conversion on the audio stream. The electronic device is thus reconfigured to be able to better recognize the words and context within the (remainder of) the spoken speech and retrieve relevant information related to the specific domain to which the speech corresponds/correlates.

In this disclosure, the term "keyword" is utilized to provide a different functionality and/or meaning than "trigger word," which is assumed to refer to and be synonymous with a "wake-up" word or phrase. According to the present disclosure, an electronic device configured for audio signal processing detects keywords within an audio stream. The electronic device identifies confidence weights associated with the detected keywords, where the confidence weights indicate a likelihood that the detected keywords relate to a specific domain. The electronic device then compares an accumulation of the confidence weights to a domain-specific activation threshold value to determine whether the audio stream relates to the specific domain. The embodiments of the present disclosure provide an AMCA module that passively listens to a received audio streams and determines whether the audio content includes at least one keyword that matches any of multiple keywords stored in a database.

Unlike in conventional applications, where the electronic device listens to a continuous stream of received audio solely to determine whether a trigger word is detected, the present disclosure enables listening for and responding to detection of keywords that are not necessarily preceded by a trigger word. According to another aspect of one or more embodiments of this disclosure, the electronic device detects that user speech within an audio stream is related to a particular domain, and then activates a domain-specific automatic speech recognition (DS-ASR) engine (within the electronic device) configured for that particular domain. Identifying the particular domain enables the electronic device to generate a more accurate response from the DS-ASR engine, compared to a response from a general-purpose ASR. Activating the DS-ASR engine enables the processing device (e.g., local processor) to utilize less computational resources because a DS-ASR utilizes less computational resources than a general-purpose ASR. Further, less computational and power resources are expended by bypassing having to analyze the audio stream with a general-purpose ASR in order to determine the particular domain to which the audio stream relates. As an example, in embodiments according to the present disclosure, when a user is speaking natural language while engaged in a certain topic discussion, the AMCA module activates the DS-ASR engine to assist the user in performing a task (e.g., set up a meeting calendar for the user based on information within the conversation) or to help the user establish/update a user profile (e.g., user likes burgers, but does not like pizza). The AMCA module activates the DS-SR engine even though no wake-up words are said during the conversation.

In the following description, specific example embodiments in which the disclosure may be practiced are described in sufficient detail to enable those skilled in the art to practice the disclosed embodiments. For example, specific details such as specific method sequences, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 2:
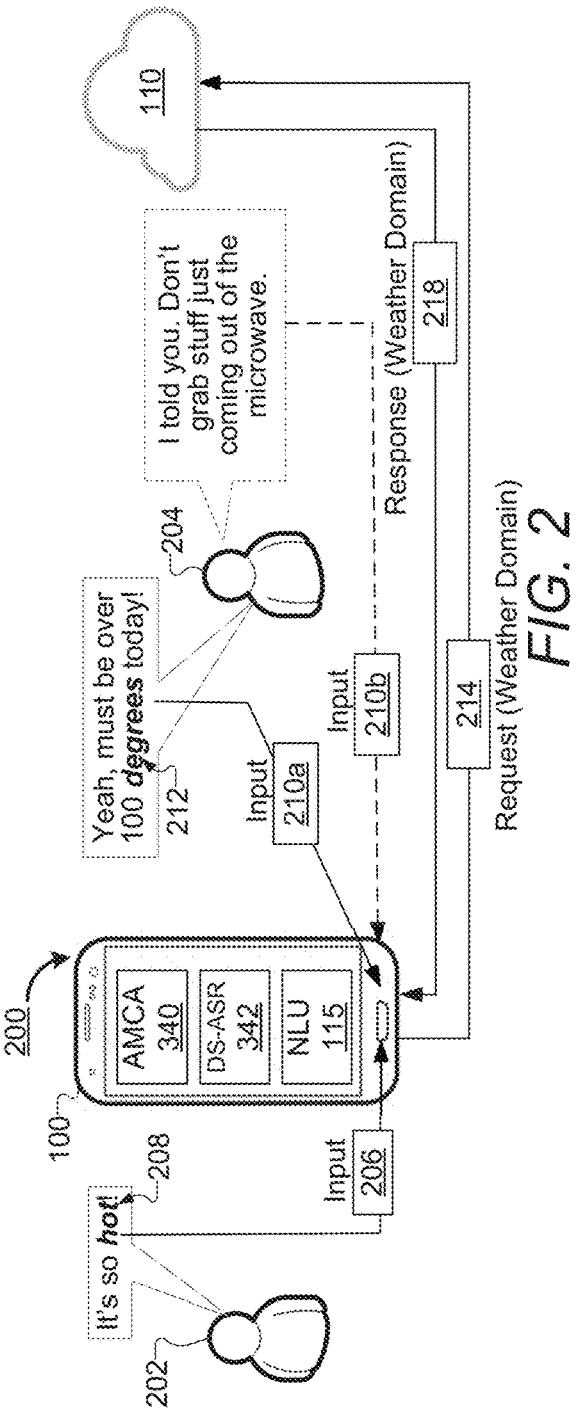
FIG. 2 illustrates an example scenario in which a DS-ASR engine within the example system is activated based on an accumulated confidence score meeting an activation threshold value of a specific domain, in accordance with one or more embodiments of this disclosure.

Both FIGS. 1 and 2 illustrate an example system with an electronic device 100 that implements AMCA processes to perform domain spotting in accordance with one or more embodiments of this disclosure. The example system operates based on natural language spoken by a user 104 (FIG. 1) or based on natural language of a conversation between a user and another person 204 (FIG. 2). More particularly, FIG. 1 illustrates an example where electronic device 100 implements an AMCA process (such as process 900 of FIG. 9) to activate a domain-specific automatic speech recognition (DS-ASR) engine, in accordance with one or more embodiments of this disclosure. Electronic device 100 can have the same or similar configuration as DPS 300 of FIG. 3. As an example, electronic device 100 could include components such as AMCA module 340 and DS-ASR engines 342 shown in FIG. 3. Alternatively, electronic device 100 can also have the same or similar configuration as mobile device 400 of FIG. 4.

Electronic device 100 passively listens to an audio stream 102 containing speech 106 spoken by user 104. Speech 106 of user 104 follows a natural language format, in that user 104 speaks without conscious planning or premeditation, as if speaking to another person. Speech 106 of user 104 does not contain a wake-up word. For example, speech 106 can be "Oh, it is raining outside. The kid's soccer game might be canceled."

In implementing the AMCA process, electronic device 100 performs domain spotting based on a list of keywords. That is, electronic device 100 stores a database containing a list of multiple keywords, each keyword being related to at least one of multiple domains stored in the database. Once electronic device 100 detects a keyword within audio stream 102 (e.g., by executing keyword spotting algorithms that detect words within the stored domains), electronic device 100 selects which domain(s) are related to speech 106 within audio stream 102. An identification of the selected domain(s) indicates which DS-ASR engine(s), if any, to activate for processing the audio stream 102. The selection of which DS-ASR engine to activate is based on an accumulation of domain-specific confidence weights assigned to the detected keyword, alone or together with subsequent keywords within audio stream 102. Electronic device 100 activates DS-ASR engine(s) indicated by the identification of the selected domain(s).

In activating the selected DS-ASR engine(s), electronic device 100 generates an activation signal. Within electronic device 100, the selected DS-ASR engine(s) receives the activation signal. That is, the activation signal triggers (for example, activates or wakes up) a specified DS-ASR engine within electronic device 100. Note that an "activation signal" is not similar to a "wake-up word." That is, when a user speaks a wake-up word, the wake-up word does not specify a topic of conversation to which a stream of audio is related, but instead merely indicates to an electronic device that a stream of audio (of an undetected topic and unknown domain) is forthcoming. In contrast, with ASR modified to include ACMA processing of detected speech, electronic device 100 automatically generates the activation signal for a selected DS-ASR engine after audio stream 102 has been analyzed to detect the domain(s) related to the speech within the automatically detected audio stream 102. Once activated, the selected DS-ASR engine(s) receive other data, including audio stream 102 (for example, a waveform representation of speech 106) and the identification of the selected domain(s) that are related to speech 106. The identification of the selected domain(s) specifies that a DS-ASR engine corresponding to the same selected domain(s) needs to perform speech-to-text conversion on the audio stream 102.

Within electronic device 100, the selected DS-ASR engine transcribes audio stream 102 (including sounds uttered by user 104) into words in a text format. More particularly, electronic device 100 can comprise various DS-ASR engines (such as 342A-342C of FIG. 3) for different domains (e.g., weather, sports, food). For example, a weather-domain DS-ASR engine (such as 342A of FIG. 3) can correspond to the "weather" domain, and as such, is configured (i.e., trained) to transcribe weather-related words more accurately than a general-purpose ASR engine and more accurately than other domain-specific ASR engines (such as 342B-342C of FIG. 3), which are not trained on a similar corpus of weather-related words. Similarly, sports-domain DS-ASR engine (such as 342B of FIG. 3) and food-domain DS-ASR engine (such as 342C of FIG. 3) can correspond to the "sports" and "food" domains, respectively.

Electronic device 100 generates a transcription of audio stream 102 (for example, a text format representation of speech 106 output from selected DS-ASR engine(s)). More particularly, electronic device 100 generates the transcription by implementing AMCA and DS-ASR processes on speech 106 within audio stream 102. In one example of the AMCA processes, electronic device 100 detects multiple keywords (for example, "soccer" and "game") related to the sports domain, and electronic device 100 determines that audio stream 102 contains speech 106 that is related to the sports domain. In another example, electronic device 100 detects a pairing of a keyword (for example, "raining") and a context word (for example, "outside") related to the weather domain, and determines (with high confidence) that audio stream 102 contains speech 106 that is related to the weather domain. Based on the determination that speech 106 relates to the weather domain or sports domain, electronic device 100 activates the weather-domain DS-ASR (e.g., 342A of FIG. 3) or sports-domain DS-ASR (e.g., 342B of FIG. 3). More particularly, in response to activating, weather-domain DS-ASR engine (e.g., 342A of FIG. 3) and sports-domain DS-ASR engine (e.g., 342B of FIG. 3) transcribe audio stream 102 from audio format to text format.

The activated DS-ASR engines (e.g., 342A-342B of FIG. 3) transcribe audio stream 102 into words in a text format. Meanwhile, unselected DS-ASR engines (e.g., 342C of FIG. 3) are allowed to remain in sleep mode or off. By only executing selected DS-ASR engine(s) (e.g., 342A-342B of FIG. 3) to transcribe audio stream 102, the electronic device 100 reduces usage of computing resources (e.g., power, processing resources, and/or time) compared with executing a general-purpose ASR to transcribe audio stream 102. Within DS-ASR engines 342, each of the individual DS-ASR engines 342A, 342B, 342C executes a smaller sized neural network (i.e., having few neural network layers, having fewer nodes per layer, and capable of detecting fewer words and phrases) than a general-purpose ASR engine, which requires utilizing a more complex and larger neural network that is within the computing cloud.

Electronic device 100 includes natural language understanding (NLU) system 115 that enables machine to comprehend what a body of text really means. Within electronic device 100, NLU system 115 receives a transcription of audio stream 102, for example, a text format representation of speech 106 output from selected DS-ASR engine(s). NLU system 115 determines the user intent from the text transcription. For example, NLU system 115 determines the user intent includes weather at current time at current location, status of soccer game appointment, and weather at time of soccer game appointment at the soccer game location. Within electronic device 100, NLU system 115 generates request 108 that calls application service 114 to perform a task(s) based on the user intent. NLU system 115 can configure request 108 to indicate multiple user intents. NLU system 115 can generate request 108 as a request for the "weather conditions" at a time/location detected from speech, or as request for "kid's soccer schedule" status of a date detected from speech. Electronic device 100 transmits request 108 (containing user intent(s) output from NLU system 115) to application service 114 via computing cloud 110, which represents other devices, services, and components that are located external (remote) to electronic device 100, and which can interface with electronic device 100 via an external network using one or more communication protocols. For purposes of discussion, computing cloud 110 is indicated as a single collective component for simplicity. However, it is appreciated that computing cloud 110 can comprise one or more direct connections to other devices, as well as a more complex set of interconnections as can exist within a wide area network, such as the Internet. Computing cloud 110 includes a collection of interconnected physical servers, one or more of which processes "requests" (such as request 108 and request 112) generated by and received from user devices (such as from DS-ASR engines 342/NLU system 115 within electronic device 100). In some implementations, computing cloud 110 includes a collection of interconnected physical servers that communicate with services, such as application service 114, through the network for task completion or information acquisition. That is, computing cloud 110 receives and forwards request 108 received from electronic device 100 to application service 114 as a forwarded request 112.

Application service 114 includes multiple application services related to different topics, such as a weather application service 120, a sports application service 122, and a food application service 124. In some embodiments, application service 114 could include navigation services, messaging services, calendar services, telephony services, or photo services. Application service 114 can identify multiple user intents within request 112 and can cause a weather application service 120 to process portions of the user intent that are weather-related (i.e., weather at time of soccer game appointment at soccer game location). Based on the identified user intent, the weather application service 120 can check the weather at the current time, as well as the weather forecast for the next few hours. Application service 114 can cause a sports application service 122 to process portions of the user intent that are sports-related (i.e., status of soccer game appointment). Based on the user intent, the sports application service 122 can check "kid's soccer schedule" for the status (e.g., on-time, delayed, canceled) of the current date. Application service 114 generates a response 116a, based on the user intent determined from request 112, by utilizing weather and sports application services 120 and 122. For example, the response 116a can be "No worries, rain will stop in 10 minutes. Sunshine this afternoon. The soccer game is not canceled, still 3:00 PM." Application service 114 returns response (116) to electronic device 100 via computing cloud 110. That is, computing cloud 110 receives response 116a from application service 114 and forwards response 116a to electronic device 100 as forwarded response 116b. Computing cloud 110 receives response 116a in a text format and transmits forwarded response 116b in the text format to electronic device 100. Electronic device 100 performs a text-to-speech conversion on the received forwarded response 116b. Response (116) includes task responses 126, such as weather-domain responses of providing current weather conditions, or providing a weather forecast for a future time. Other example task responses include sports-domain responses of providing a status of a soccer game schedule or providing a start time of a scheduled soccer game.

In some embodiments, computing cloud 110 also includes a natural language understanding (NLU) system 115. Electronic device 100 can optionally bypass the NLU 115 within electronic device 100, configure request 108 to include the transcription of audio stream 102, and transmit request 108 to computing cloud 110. Within computing cloud 110, the NLU system 115 determines the user intent based on the text transcription from the request 108. For example, NLU system 115 determines the user intent includes retrieving information about the weather at the current time at the current location, a status of a soccer game appointment, and the weather at the time of the soccer game appointment at the soccer game location. Computing cloud 110 generates request 112 that calls application service 114 to perform a task(s) corresponding to the user intent determined from an analysis of the words within the audio stream, and computing cloud 110 transmits request 112 (containing user intent(s) output from NLU system 115) to application service 114.

With reference now to FIG. 2, there is illustrated an example scenario 200 of electronic device 100 (FIG. 1) activating a DS-ASR engine based on an accumulated confidence score meeting an activation threshold value of a specific domain, in accordance with one or more embodiments of this disclosure. Details of FIG. 2 will be discussed more particularly below, after a description of the domain-spotting methods 900-1100 of FIGS. 9-11.

Figure 3:
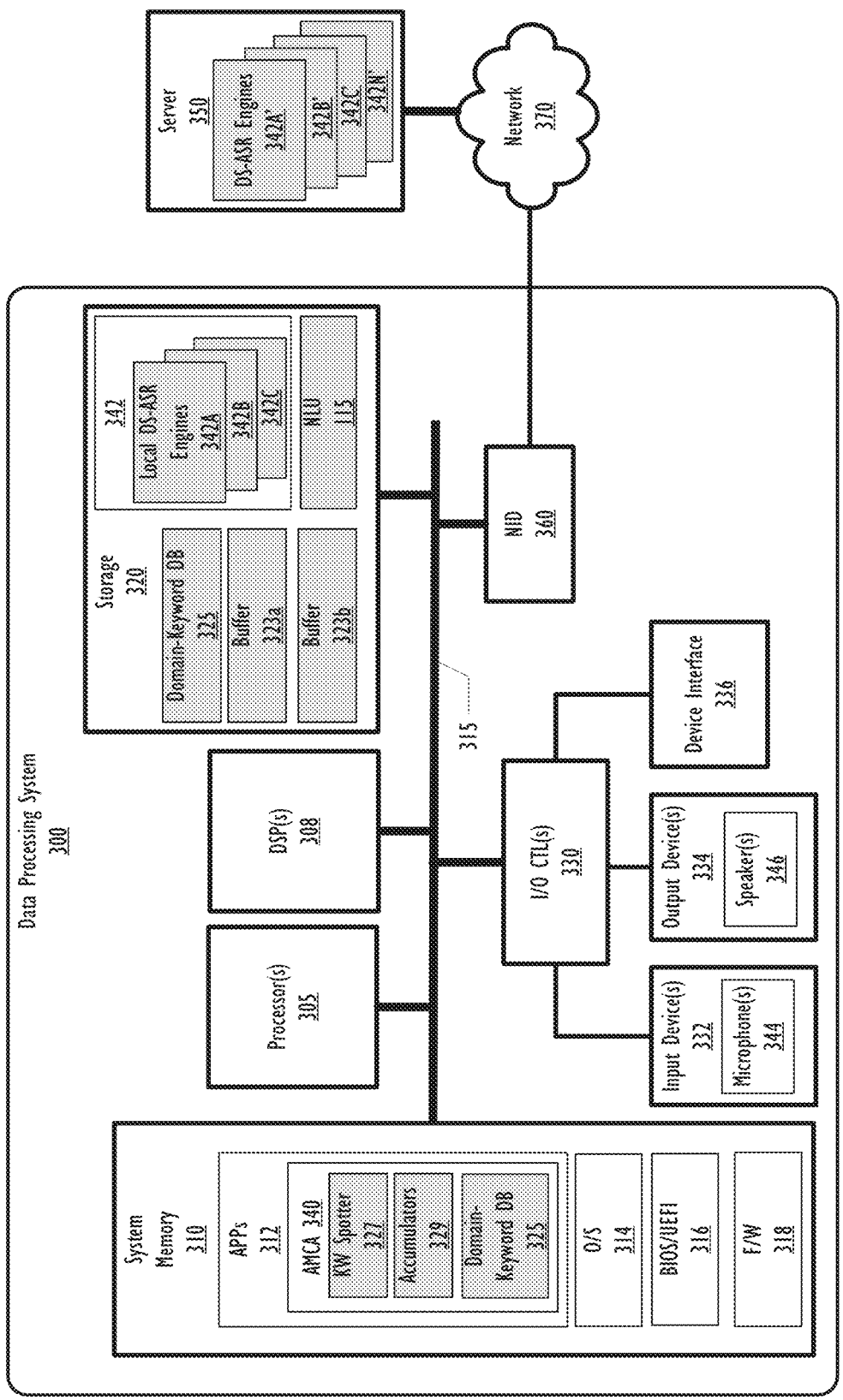
FIG. 3 is a block diagram representation of an example data processing system configured to provide the AMCA features of an ASR processing electronic device, in accordance with one or more embodiments of this disclosure.

FIG. 3 illustrates a block diagram representation of a data processing device, specifically data processing system (DPS) 300 configured to provide the AMCA features of an ASR processing electronic device, within which one or more of the described features of the various embodiments of the disclosure can be implemented. DPS 300 may be a handheld device, personal computer, a server, a network storage device, or any other device capable of detecting audio input and performing domain spotting functions. DPS 300 may vary in size, shape, performance, functionality, and price.

Referring specifically to FIG. 3, example DPS 300 includes one or more processor(s) 305 coupled to system memory 310 via system interconnect 315. System interconnect 315 can be interchangeably referred to as a system bus, in one or more embodiments. Also coupled to system interconnect 315 is storage 320 within which can be stored one or more software and/or firmware modules and/or data (not specifically shown).

In one embodiment, storage 320 can be a hard drive or a solid-state drive. The one or more software and/or firmware modules within storage 320 can be loaded into system memory 310 during operation of DPS 300. In at least one embodiment, NLU system 115 is stored in storage 320 of DPS 300. NLU system 115 of FIG. 3 can have the same or similar configuration as NLU system 115 of FIG. 1. Storage 320 can include and/or be used as a buffer for temporarily storing audio content from an audio stream received via microphones 344. In some embodiments, storage 320 includes a first buffer 323a that stores audio content that is received by DS-ASR engines 342 for transcribing an audio stream (e.g., 1 minute of audio length), and a second buffer 323b that stores audio content (e.g., 10 seconds of audio length) that is processed by AMCA module 340 to accumulate a confidence score. The first and second buffers 323a-323b can be different buffers, alternatively, the second buffer 323b can be a portion of the first buffer 323a. The various software and/or firmware modules have varying functionality when their corresponding program code is executed by processor(s) 305 or other processing devices within DPS 300.

As shown, system memory 310 can include therein a plurality of software and/or firmware modules including application(s) 312, operating system (O/S) 314, basic input/output system/unified extensible firmware interface (BIOS/UEFI) 316, and other firmware (F/W) 318.

DPS 300 also includes AMCA module 340. AMCA module 340 may be provided as an application that is optionally located within system memory 310 and executed by processor 305. Within this embodiment, processor 305 executes AMCA module 340 to provide the various methods and functions described herein. For simplicity, AMCA module 340 may be referred to as simply AMCA 340. It is, however, understood that processor 305 executes AMCA 340 to provide the various methods and functions described herein. For simplicity, AMCA 340 is illustrated and described as a stand-alone or separate software/firmware/logic component, which provides the specific functions and methods described herein. However, in at least one embodiment, AMCA 340 may be a component of, may be combined with, or may be incorporated within OS 314, and/or with one or more applications 312. AMCA 340 includes a domain-keyword database 325, a keyword spotter module 327 (hereinafter "keyword spotter"), and confidence score accumulators 329, which are used by AMCA 340 to perform the accumulative AMCA processes described herein. In at least one embodiment, domain-keyword database 325 is stored in storage 320 of DPS 300. Additional aspects of AMCA 340, and functionality thereof, are presented within the description of FIGS. 5-11.

DPS 300 further includes one or more input/output (I/O) controllers 330, which support connection by, and processing of signals from, one or more connected input device(s) 332, such as a keyboard, mouse, touch screen, sensors, and microphone 344. Microphone 344 detects oral speech of a user and other sounds in the form of sound waves. For example, microphone 344 can detect a stream of audio, such as audio stream 102 of FIG. 1. I/O controllers 330 also support connection to and forwarding of output signals to one or more connected output devices 334, such as a display, or audio speaker(s) 346. Additionally, in one or more embodiments, one or more device interface(s) 336, such as an optical reader, a universal serial bus (USB), a card reader, Personal Computer Memory Card International Association (PCMIA) slot, and/or a high-definition multimedia interface (HDMI), can be coupled to I/O controllers 330 or otherwise associated with DPS 300. Device interface(s) 336 can be utilized to enable data to be read from or stored to additional devices (not shown) for example a compact disk (CD), digital video disk (DVD), flash drive, or flash memory card. In one or more embodiments, device interface(s) 336 can further include General Purpose I/O interfaces, such as an Inter-Integrated Circuit (I²C) Bus, System Management Bus (SMBus), and peripheral component interconnect (PCI) buses.

DPS 300 further comprises a network interface device (NID) 360. NID 360 enables DPS 300 to communicate and/or interface with other devices, services, and components that are located external (remote) to DPS 300, for example, server 350, via a communication network. These devices, services, and components can interface with DPS 300 via an external network, such as example network 370, using one or more communication protocols. Network 370 can be a local area network, wide area network, personal area network, signal communication network, and the like, and the connection to and/or between network 370 and DPS 300 can be wired or wireless or a combination thereof. For purposes of discussion, network 370 is indicated as a single collective component for simplicity. However, it is appreciated that network 370 can comprise one or more direct connections to other devices, such as server 350, as well as a more complex set of interconnections as can exist within a wide area network, such as the Internet.

In some embodiments, server 350 includes an NLU system and an application service, such as NLU 115 and application service 114 of FIG. 1. In some embodiments, server 350 represents external device, such as an Internet server that provides responses to search terms and search queries received from DPS 300 via network 370. In some embodiments, server 350 includes cloud-based DS-ASR engines 342A'-342N', in which cloud-based DS-ASR engines 342A'-342C' represent a copy or updated-version of local DS-ASR engines 342A-342C. Cloud-based DS-ASR engine(s) 342N' represent DS-ASR engine(s) that are not stored in storage 320 of electronic device 100 and correspond to other domains (i.e., other than weather, food, and sports).

DPS 300 also includes domain-specific automatic speech recognition (DS-ASR) engines 342 that are stored locally in storage 320. Each of the multiple DS-ASR engines 342 performs the functions of audio speech recognition for a specific domain. Within this embodiment, processor 305 executes one or more of DS-ASR engines 342 to perform the functions of the respective one or more DS-ASR engines. For example, the multiple DS-ASR engines 342 of DPS 300 can include weather-domain DS-ASR 342A, sports-domain DS-ASR 342B, food-domain DS-ASR 342C, and any other DS-ASR engine of another domain. In some embodiments, DS-ASR engines 342 may be provided as an application that is optionally located within or loaded into system memory 310 and executed by processor 305. In at least one embodiment, DS-ASR engines 342 may be a component of, may be combined with, or may be incorporated within OS 314, and/or with one or more applications 312. According to various embodiments of this disclosure, DS-ASR engines 342 could be an independent application, or a system application of the DPS 300. The local DS-ASR engines 342 can be a subset of cloud-based DS-ASR engines 342A'-342N'. DPS 300 can select to process a subset of domains locally by processor 305 and can obtain local DS-ASR engines 342 (for example by downloading a copy of selected cloud-based DS-ASR engines 342A'-342N'). DS-ASR engines 342 can correspond to domains that are selected by a user. In at least one embodiment, DS-ASR engines 342 can correspond to domains that are predetermined settings (e.g., factory settings).

Figure 4:
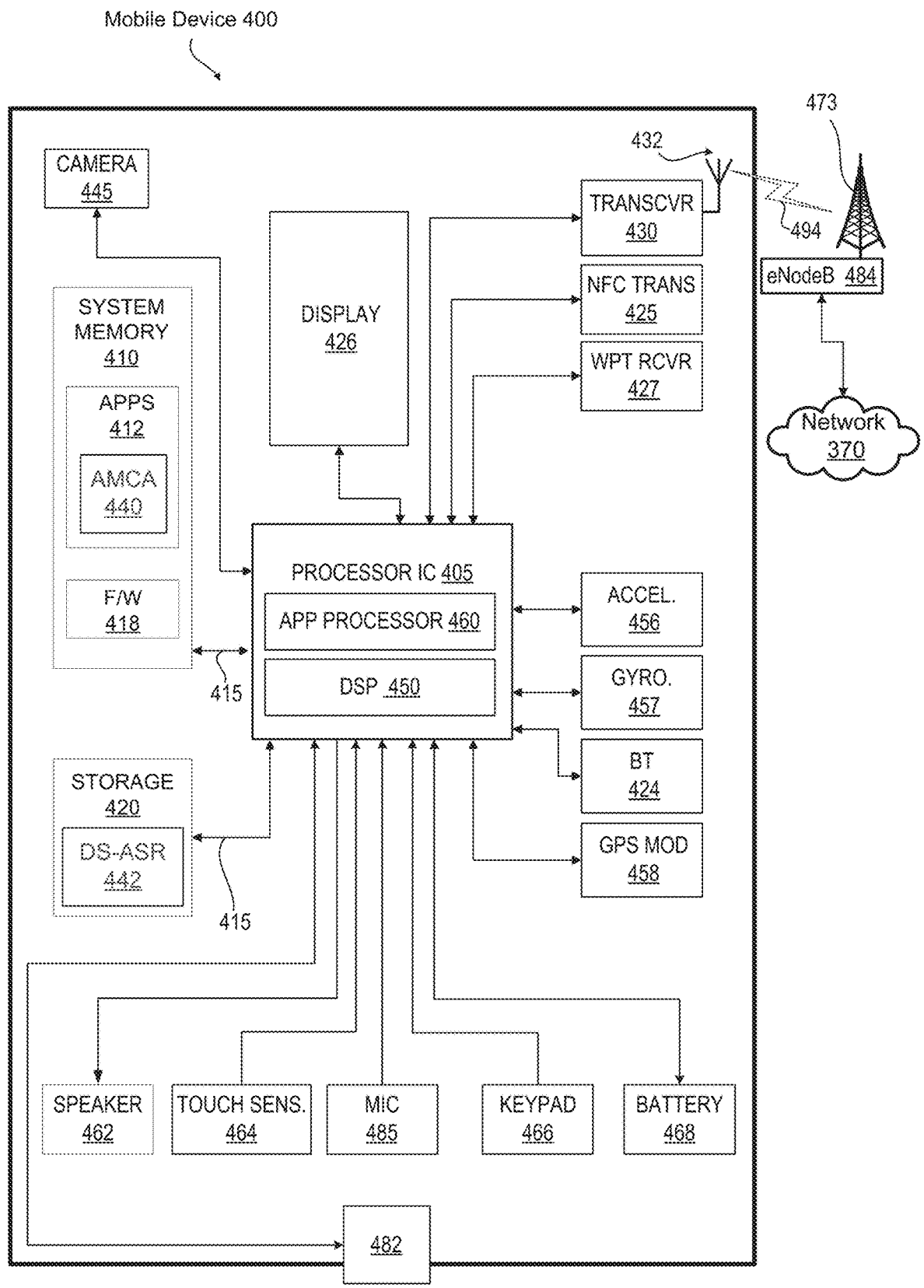
FIG. 4 illustrates a mobile device configured to provide the AMCA features of an ASR processing electronic device, in accordance with one or more embodiments of this disclosure.

In the description of the following figures, reference is also occasionally made to specific components illustrated within the preceding figures, utilizing the same reference numbers from the earlier figures. With reference now to FIG. 4, there is illustrated example mobile device 400. The embodiment of mobile device 400 illustrated in FIG. 4 is for illustration only, and electronic device 100 of FIGS. 1 and 2 and/or DPS 300 of FIG. 3 could have the same or similar configuration.

Mobile device 400 includes at least one processor integrated circuit 405. Included within processor IC 405 are DSP 450 and application processor (or simply processor) 460. Processor IC 405 is coupled to system memory 410 and non-volatile storage 420 via one or more system communication mechanisms, such as system interconnects 415. System interconnects 415 can be interchangeably referred to as a system bus, in one or more embodiments. One or more software and/or firmware modules can be loaded into system memory 410 during operation of mobile device 400. Specifically, in one embodiment, system memory 410 can include therein a plurality of such modules, including firmware (F/W) 418. System memory 410 may also include basic input/output system and an operating system (not shown). The software and/or firmware modules provide varying functionality when their corresponding program code is executed by application processor 460 or by secondary processing devices within mobile device 400.

Processor IC 405 supports connection by and processing of signals from one or more connected input devices such as camera 445, touch sensor 464, microphone 485, and keypad 466. Processor IC 405 also supports connection by and processing of signals to one or more output devices, such as speaker 462 and display 426, which could be the same or similar to output devices 334 of FIG. 3. Additionally, in one or more embodiments, one or more device interfaces 482, such as an optical reader, a universal serial bus (USB), a card reader, Personal Computer Memory Card International Association (PCMIA) slot, and/or a high-definition multimedia interface (HDMI), can be associated with mobile device 400. Mobile device 400 also contains a power source such as a battery 468 that supplies power to mobile device 400.

Mobile device 400 further includes Bluetooth transceiver 424, global positioning system module (GPS MOD) 458, gyroscope 457, accelerometer 456, and various other sensors, all of which are communicatively coupled to processor IC 405. Bluetooth transceiver 424 enables mobile device 400 and/or components within mobile device 400 to communicate and/or interface with other devices, services, and components that are located external to mobile device 400. GPS MOD 458 enables mobile device 400 to communicate and/or interface with other devices, services, and components to send and/or receive geographic position information. Gyroscope 457 communicates the angular position of mobile device 400 using gravity to help determine orientation. Accelerometer 456 is utilized to measure non-gravitational acceleration and enables processor IC 405 to determine velocity and other measurements associated with the quantified physical movement of a user.

Mobile device 400 is presented as a wireless communication device. As a wireless device, mobile device 400 can transmit data over wireless network 370. Mobile device 400 includes transceiver 430, which is communicatively coupled to processor IC 405 and to antenna 432. Transceiver 430 allows for wide-area or local wireless communication, via wireless signal 494, between mobile device 400 and evolved node B (eNodeB) 484, which includes antenna 473. Mobile device 400 is capable of wide-area or local wireless communication with other mobile wireless devices or with eNodeB 484 as a part of a wireless communication network.

Mobile device 400 communicates with other mobile wireless devices by utilizing a communication path involving transceiver 430, antenna 432, wireless signal 494, antenna 485, and eNodeB 484. Mobile device 400 additionally includes near field communication transceiver (NFC TRANS) 425 and wireless power transfer receiver (WPT RCVR) 427. In one embodiment, other devices within mobile device 400 utilize antenna 432 to send and/or receive signals in the form of radio waves. For example, GPS module 458 can be communicatively coupled to antenna 432 to send and receive location data.

As provided by FIG. 4, mobile device 400 additionally includes AMCA module 440 (hereinafter "AMCA" 440). AMCA 440 may be provided as an application that is optionally located within the system memory 410 and executed by processor IC 405. Within this embodiment, processor IC 405 executes AMCA 440 to provide the various methods and functions described herein. AMCA 440 enables mobile device 400 to perform the functions of a domain spotting system. In at least one embodiment, AMCA 440 may be a component of, may be combined with, or may be incorporated within one or more applications 412.

As shown in FIG. 4, mobile device 400 also includes domain-specific automatic speech recognition (DS-ASR) engines 442 that are stored locally in storage 420. Each DS-ASR engine 442 performs the functions of an audio speech recognition for a specific domain. Within this embodiment, processor IC 405 selectively activates one or more of the DS-ASR engines 342, in part based on accumulative confidence scores generated during implementation of the AMCA processes described herein. Processor IC 405 executes, and thereby, performs the functions of the selectively activated one or more of the DS-ASR engines 442.

Figures 5, 6:
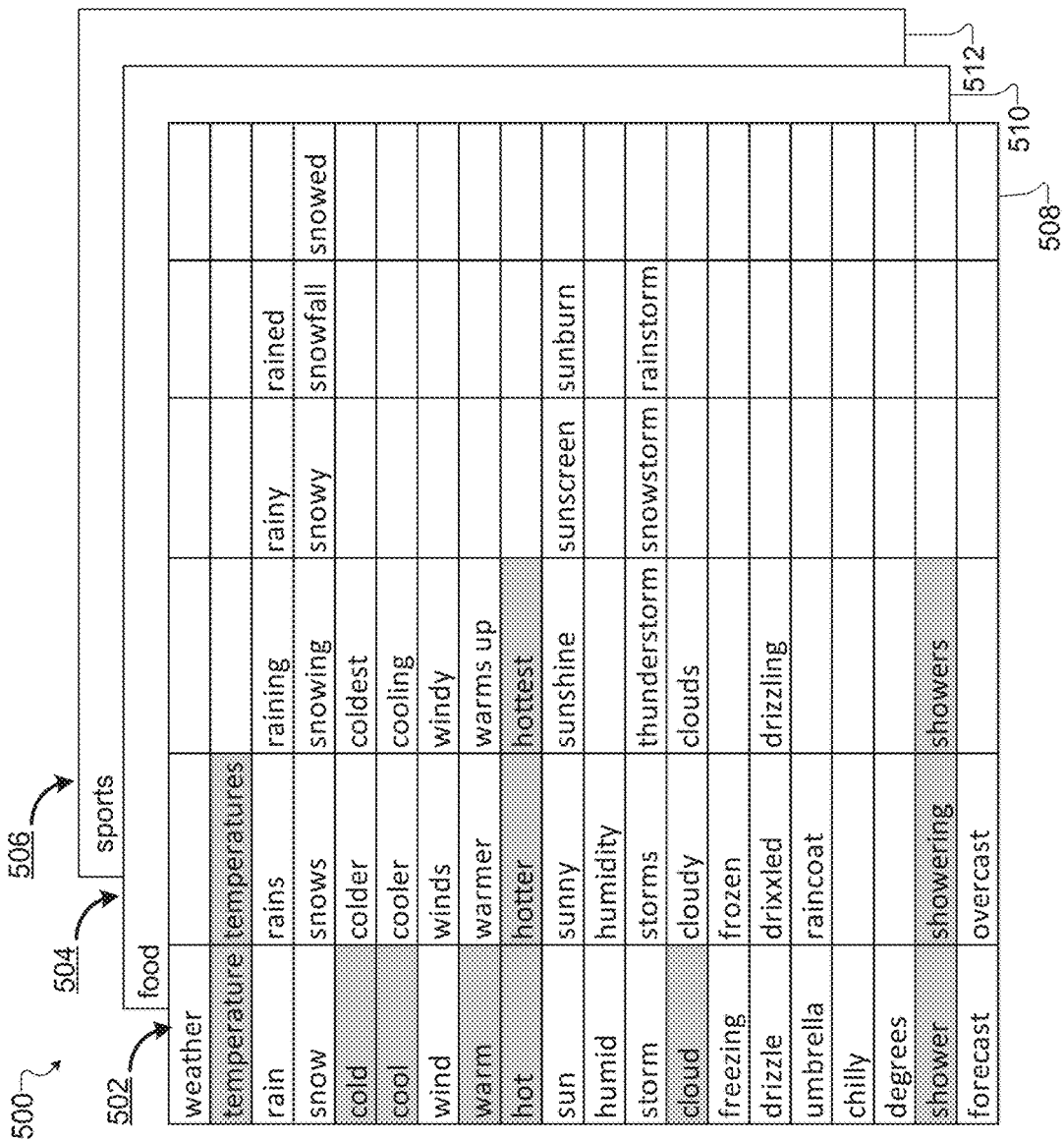
FIG. 5 illustrates a database having keywords assigned to domains, in accordance with one or more embodiments of this disclosure.
FIG. 6 illustrates an example table of domain-specific confidence weights assigned to the keywords within the database of FIG. 5, in accordance with one or more embodiments of this disclosure.

With reference now to FIG. 5, there are illustrated domains within a database 500, with an example weather domain 508 having multiple keywords 502 assigned thereto, in accordance with one or more embodiments of this disclosure. The embodiment of database 500 illustrated in FIG. 5 is for illustration only. In one embodiment, database 500 is stored (as Domain-Keyword DB 325) in system memory 310 or in storage 320 of DPS 300 and can be a component of AMCA 340 of FIG. 3. Keyword spotter 327 of AMCA 340 of FIG. 3 performs keyword spotting by detecting keywords that are within database 500.

Database 500 stores a list of keywords 502 related to a weather domain 508, a list of keywords 504 related to a food domain 510, and list of keywords 506 related to a sports domain 512. For simplicity, the list of keywords 502 related to weather domain 508 may be referred to as simply weather-related keywords 502; the list of keywords 504 related to the food domain 510 may be referred to as simply food-related keywords 504; and the list of keywords 506 related to the sports domain 512 may be referred to as simply sports-related keywords 506. Database 500 is not limited to storing a weather domain 508, a food domain 510, and a sports domain 512, and can store additional domains for different conversation topics. Database 500 stores at least one list of keywords per domain.

A single keyword may appear within multiple different domains (having different/separate lists of keywords), meaning that the single keyword is related to multiple domains. Such a keyword may be referred to as a multi-domain keyword. For example, the word "hot" is listed among the weather-related keywords 502 because the word is a frequently used descriptor of outdoor temperatures, and the word "hot" is also listed among the food-related keywords 504 (not expressly shown) because the word is a frequently used descriptor of the level of spiciness or temperature of food.

Each of the lists of keywords 502, 504, and 506 can be arranged in any suitable manner, and may be sorted or divided into groups in any suitable manner. For example, weather-related keywords 502 are arranged in an array of columns and rows.

FIG. 6 illustrates a table 600 of domain-specific confidence weights assigned to the keywords within the database 500 of FIG. 5, in accordance with one or more embodiments of this disclosure. That is, FIG. 6 shows additional components of database 500 of FIG. 5. The example table 600 of domain-specific confidence weights and other additional components of database 500 illustrated in FIG. 6 are for illustration only. Column 601 of weather-related keywords 502 of FIG. 5 could be utilized in table 600 of FIG. 6 in the same or similar configuration. Although the only domain-specific confidence weights visible in FIG. 6 are the domain-specific confidence weights assigned to the keywords within column 601, it is understood that table 600 of database 500 stores domain-specific confidence weight(s) 602, 604, 606 of all keywords that are stored in database 500.

When a keyword is detected during performance of keyword spotting, AMCA 340 of FIG. 3 identifies, from within database 500, domain-specific confidence weight(s) 602, 604, 606 of the detected keyword that are stored within database 500. AMCA 340 of FIG. 3 (or AMCA 440 of FIG. 4 in a similar manner) uses the domain-specific confidence weight(s) 602, 604, 606 of the detected keyword to perform domain spotting. Namely, the domain spotting performed by AMCA 340 includes calculating a domain-specific confidence score that represents a confidence level of the AMCA 340 that an audio stream has been correctly categorized into the domain. That is, a domain-specific confidence score is used by AMCA 340 to determine whether a domain was identified. If the domain-specific confidence score meets acceptance criteria, then AMCA 340 determines that the relevant domain to which both the confidence score and acceptance criteria are related is identified in the audio stream.

For each of the multiple domains stored in database 500, a domain-specific confidence weight is assigned to each keyword within the database 500. A domain-specific confidence weight is a numerical value indicating a likelihood that a corresponding keyword relates to the specific domain. According to one aspect of the disclosure, a domain-specific confidence weight can be a probability value (i.e., between zero (0) and positive one (1)) indicating that a likelihood of corresponding keyword relates to the specific domain. Additionally and/or alternatively, the domain-specific confidence weight can be a correlation value (i.e., between negative one (−1) and positive one (+1)) indicating a degree of association between a corresponding keyword and the specific domain. The domain-specific confidence weight can be a predetermined value, and can be updated based on machine learning and user experience. Weather-domain confidence weights 602, food-domain confidence weights 604, and sports-domain confidence weights 606 are listed in three columns, with each row corresponding to a keyword in the same row of column 601. That is, keywords in column 601 are each assigned a corresponding weather-domain confidence weight 602, food-domain confidence weight 604, and sports-domain confidence weights 606, assuming the keyword is actually found in the particular domain. Blank entries in the different domain confidence weight columns 604 and 606 indicate that the keyword has no association with and thus no confidence weight for that domain.

Among weather-domain confidence weights 602, a weather-domain confidence weight of "1.0" is assigned to the keyword "weather" of column 601. In this non-limiting example, the weather-domain confidence weight of "1.0" indicates 100% confidence that speech within an audio stream is related to the weather domain when the keyword "weather" is detected within the audio stream. In general, domain-specific confidence weights have a value inclusively within a range of 0.0 and +1.0. In some embodiments, domain-specific confidence weights have a value inclusively within a range of –1.0 and +1.0, but other embodiments may utilize a different range of values without departing from the scope of this disclosure.

Among food-domain confidence weights 604, a food-domain confidence weight of "–0.5" is assigned to the keyword "weather" in column 601. In this non-limiting example, the food-domain confidence weight of "–0.5" indicates –50% confidence that speech within an audio stream is related to the food domain when the keyword "weather" is detected within the audio stream.

Among sports-domain confidence weights 606, a sports-domain confidence weight of a null value is assigned to the keyword "weather" in column 508. In this non-limiting example, the sports-domain confidence weight of a null value indicates 0% confidence that speech within an audio stream is related to the sports domain because the keyword "weather" is detected within the audio stream. In some embodiments, every keyword in database 500 is assigned a domain-specific confidence weight for each and every domain stored in the database 500, even if the confidence weight is zero or another low value (e.g., less than 0.2). In some embodiments, each keyword in database 500 is assigned a domain-specific confidence weight for only domain(s) to which the keyword is sufficiently related (e.g., having a non-null confidence weight, or having a confidence weight≥0.2), and the keyword is not assigned any confidence weight (namely, is assigned a null value as confidence weight) for insufficiently-related domains.

In accordance with embodiments of this disclosure, AMCA 340 performs domain spotting to determine whether to categorize a stream of audio (e.g., audio stream 102 of FIG. 1) as corresponding to a domain that is stored in database 500. AMCA 340 can perform domain spotting for each of the multiple domains that are stored in database 500, but in order to avoid duplicative explanations, it is understood that the detailed description of domain spotting for the weather domain applies analogously to other domains. In performance of domain spotting, AMCA 340 calculates a weather-domain confidence score by accumulating the weather-domain confidence weight 602 of one or more weather-related keywords 502 detected in a stream of audio (e.g., audio stream 102 of FIG. 1). For example, keyword spotter 327 of AMCA 340 may perform keyword spotting on audio stream 102 of FIG. 1) and detect the keyword "raining" as a first keyword, namely the initial keyword detected within audio stream 102. Among weather-domain confidence weights 602, AMCA 340 identifies that a weather-domain confidence weight of "1.0" is assigned to the keyword "raining" within database 500. In some embodiments, prior to performing domain spotting, the weather-domain confidence score has no value, but in other embodiments, the weather-domain confidence score is set to zero. If prior to performing domain spotting, the weather-domain confidence score has no value, AMCA 340 sets the weather-domain confidence score as equivalent to the value 1.0, which is the weather-domain confidence weight of the initially detected keyword "raining". Alternatively, if prior to performing domain spotting, the weather-domain confidence score was set to zero, AMCA 340 adds the value 1.0 of the weather-domain confidence weight of the initially detected keyword "raining" to the weather-domain confidence score. In this non-limiting example, the weather-domain acceptance criteria are a weather-domain confidence score that is at least equal to 0.8 (≥0.8), where the value 0.8 is referred to as the weather-domain activation threshold value. In response to determining that the weather-domain confidence score meets (i.e., is equal to or greater than) the weather-domain acceptance criteria, AMCA 340 determines that the weather domain is identified in audio stream 102. That is, in response to determining that the weather-domain confidence score meets the weather-domain acceptance criteria, AMCA 340 determines that speech 106 within audio stream 102 is related to the weather domain. This example shows that in some situations, a domain-specific confidence weight of one keyword is sufficient to cause the domain-specific confidence score to meet domain-specific acceptance criteria, which thereby causes the AMCA 340 to determine that the corresponding domain is identified in the stream of audio.

However, in other situations, such as when the initially detected keyword is a multi-domain keyword, the domain-specific confidence weight of one keyword is insufficient to cause the domain-specific confidence score to meet domain-specific acceptance criteria, so AMCA 340 continues accumulating confidence weights into the domain-specific confidence score. Within table 600, for each domain related to the multi-domain keyword, the domain-specific confidence weight of the multi-domain keyword is less than the domain-specific acceptance criteria. For example, as described above, database 500 includes the multi-domain keyword "hot" in column 601, and within table 600, a weather-domain confidence weight 602 of "0.4" and a food-domain confidence weight 604 of "0.4" are assigned to the multi-domain keyword "hot." In this non-limiting example, the pre-established food-domain acceptance criteria is a food-domain confidence score that is at least equal to a food-domain activation threshold value of 0.7 (≥0.7) and the pre-established weather-domain acceptance criteria is ≥0.8. Thus, the food-domain confidence weight 604 of "0.4" fails to meet the food-domain acceptance criteria and the weather-domain confidence weight 602 of "0.4" fails to meet the weather-domain acceptance criteria. In some embodiments of this disclosure, the food-domain acceptance criteria and weather-domain acceptance criteria have different ranges of values (namely, the food-domain activation threshold value is 0.7 and weather-domain activation threshold value is 0.8) for accepting a domain-specific confidence score, without departing from the scope of this disclosure. In other embodiments, the food-domain acceptance criteria and weather-domain acceptance criteria can have the same range of values for accepting a domain-specific confidence score. For example, the food-domain activation threshold value and weather-domain activation threshold value are both 0.8.

With reference now to FIGS. 7A, 7B, and 7C, collectively referred to as FIG. 7, there are illustrated additional components of database 500 of FIG. 5. The example additional components illustrated in FIG. 7 are only for illustration of database 500 being used by AMCA 340 to continue accumulating confidence weights into the domain-specific confidence score. This accumulation of confidence weights is implemented in situations when the domain-specific confidence weight of the initially detected keyword, alone, is insufficient to cause the domain-specific confidence score to meet the domain-specific acceptance criteria. More particularly, in some embodiments, the meaning of some of the keywords within database 500 is ambiguous when only a single keyword is detected by AMCA 340. However, the meaning of the keyword is clearer when AMCA 340 detects the keyword together with a context word within a certain time window (such as, within 10 seconds of the keyword or until a set limit of audio length of the audio stream is reached). Depending upon the design of AMCA 340, the time window can be a period that spans from before the time of the first keyword; extends from after the time of the first keyword; extends equally before and after the first keyword; or extends unequally before and after the first keyword (e.g., from 5 seconds before the keyword to 15 seconds after the keyword). In this disclosure, a time (e.g., timestamp) or temporal position of a context word in the audio stream can be before or after the time of the first keyword, depending on whether the time window spans before, after, or both before and after the time of the first keyword. Similarly, in this disclosure, a time (e.g., timestamp) or temporal position of a "subsequent keyword" in the audio stream can be before or after the time of the first keyword, depending on whether the time window spans before, after, or both before and after the time of the first keyword. FIG. 7 provides an example of the AMCA 340 updating a domain-specific confidence score to meet the domain-specific acceptance criteria by adding an enhanced (i.e., intensified or increased) domain-specific confidence weight to the domain-specific confidence score. The example additional components illustrated in FIG. 7 are related to the weather domain, but it is understood that the other domains of database 500 can include similar components that can be utilized by AMCA 340 in an analogous manner.

FIG. 7A illustrates a selection 700 of keywords that are selected from the weather-related keywords 502 within the database 500 of FIG. 5 and are able to be paired with a weather-related context word from table 702 of FIG. 7B, in accordance with one or more embodiments of this disclosure. In natural language, some words have ambiguous meanings, and these ambiguous words are usually surrounded by or spoken contemporaneously (i.e., within the same period of time) with other words that provide context clues about the meaning of the ambiguous word. Also, in natural language, certain words go together as a pair frequently used in relation to a specific domain. That is, certain words, herein referred to as "context words," contextualize certain ambiguous words into relation with one specific domain when the words are used in association with each other. In this disclosure, "context-paired keywords" refers to keywords within the selection 700 of keywords of FIGS. 7A and 7C. Similar to a multi-domain keyword, when a context-paired keyword is spoken alone or analyzed in isolation from any other words, the meaning of the context-paired keyword is ambiguous and possibly related to multiple domains or the meaning is weakly related to a specific domain. The context-paired keyword can be paired with a "context word," which is a word that impacts the meaning of and provides context clues indicating that the context-paired keyword is related to one specific domain. When the context-paired keyword is spoken contemporaneously with a "context word," as a pair, the context-paired keyword and the context word have meaning strongly related to the specific domain. The selection 700 of keywords includes the context-paired keywords "cold" 706, "cool" 708, and "hot" 710. The context-paired keywords within the selection 700 can be predetermined or otherwise set by a designer of database 500. The selection of keywords to be included as context-paired keywords within the selection of 700 can be based on any suitable criteria. For example, the keywords "cold" 706 and "hot" 710 are multi-domain keywords that, in natural language, are frequently used together with at least one of the weather-domain context words 712 of FIG. 7B in the same sentence, if not together in the same phrase. Alone, the keywords "cold" 706 and "hot" 710 could be related to the food domain or the weather domain. Alone, the keyword "cool" could be related to any domain, as it is a frequently used descriptor of a level of impressiveness or expression of acceptance. But in natural language, when any of the context-paired keywords 706, 708, 710 is spoken contemporaneously (i.e., within the same period of time) with at least one of the weather-domain context words 712 of FIG. 7B, the speech is likely strongly related to the weather domain. Accordingly, when AMCA 340 detects any context-paired keyword 706, 708, 710 contemporaneously (i.e., within the same period of time, within a same time window) with detecting at least one of the weather-domain context words 712 of FIG. 7B, then AMCA 340 continues accumulating confidence weights into the domain-specific confidence score.

FIG. 7B illustrates an example table 702 of weather-domain context words 712 and associated weather-domain confidence weights 714, in accordance with one or more embodiments of this disclosure. The weather-domain confidence weight 714 assigned to each of the weather-related context words 712 has a zero value. Accordingly, adding the weather-domain confidence weights 714 of a context word to the weather-domain confidence score does not change the value of the weather-domain confidence score.

FIG. 7C illustrates an example table 704 of enhanced confidence weights 716 assigned to the selection 700 of keywords of FIG. 7A based on being paired with any of the weather-related context words 712 of FIG. 7B, in accordance with one or more embodiments of this disclosure. As described more particularly below, FIG. 7C shows that for each domain, a domain-specific enhanced confidence weight (such as weather-domain enhanced confidence weights 716) is assigned to a subset of the list of keywords related to the domain (such as the list of keywords 502 related to a weather domain). The domain-related enhanced confidence weight (e.g., each of the weather-domain enhanced confidence weights 716) of a context-paired keyword has a greater value than the non-enhanced domain-related confidence weight (e.g., 602) of the same context-paired keyword.

As an example, if a user says "Is it going to be a cold day," aloud, then AMCA 340 will detect the keyword "cold" 706 as the initially detected keyword within a stream of audio. Once AMCA 340 detects that at least one of the weather-domain context words 712 of FIG. 7B (i.e., context word "day") was spoken contemporaneously with the initially detected keyword "cold" 706, then AMCA 340 continues accumulating confidence weights into the domain-specific confidence score.

In continuance of accumulating confidence weights into the weather-domain confidence score, AMCA 340 replaces the non-enhanced weather-domain confidence weight 602 corresponding to keyword "cold" 706 with the enhanced confidence weight 716 corresponding to keyword "cold" 706. That is, in continuance of accumulating confidence weights into the weather-domain confidence score, AMCA 340 adds the enhanced confidence weight 716 value of "1.0" related to keyword "cold" 706 to the weather-domain confidence score and subtracts the non-enhanced weather-domain confidence weight 602 value of "0.4" from the weather-domain confidence score.

In the example shown in FIG. 7C, the domain-specific enhanced confidence weight (such as weather-domain enhanced confidence weight 716) assigned to each context-paired keyword 706, 708, 710 of the selection 700 has a value that meets the domain-specific acceptance criteria (such as weather-domain acceptance criteria of ≥0.8). Accordingly, replacing the weather-domain confidence weight 602 of a context-paired keyword 706, 708, 710 with the enhanced confidence weight causes AMCA 340 to determine that the audio stream relates to the weather domain, and leads to AMCA 340 triggering a weather domain DS-ASR engine (such as DS-ASR engine 342 of FIG. 1) to perform speech recognition process on the audio stream. In at least one alternate embodiment, the domain-specific enhanced confidence weight assigned to some context-paired keywords has a value that is greater than the non-enhanced domain-specific confidence weight, yet fails to meet the domain-specific acceptance criteria (i.e., domain-specific enhanced confidence weight is less than the domain-specific activation threshold value).

Figure 8:
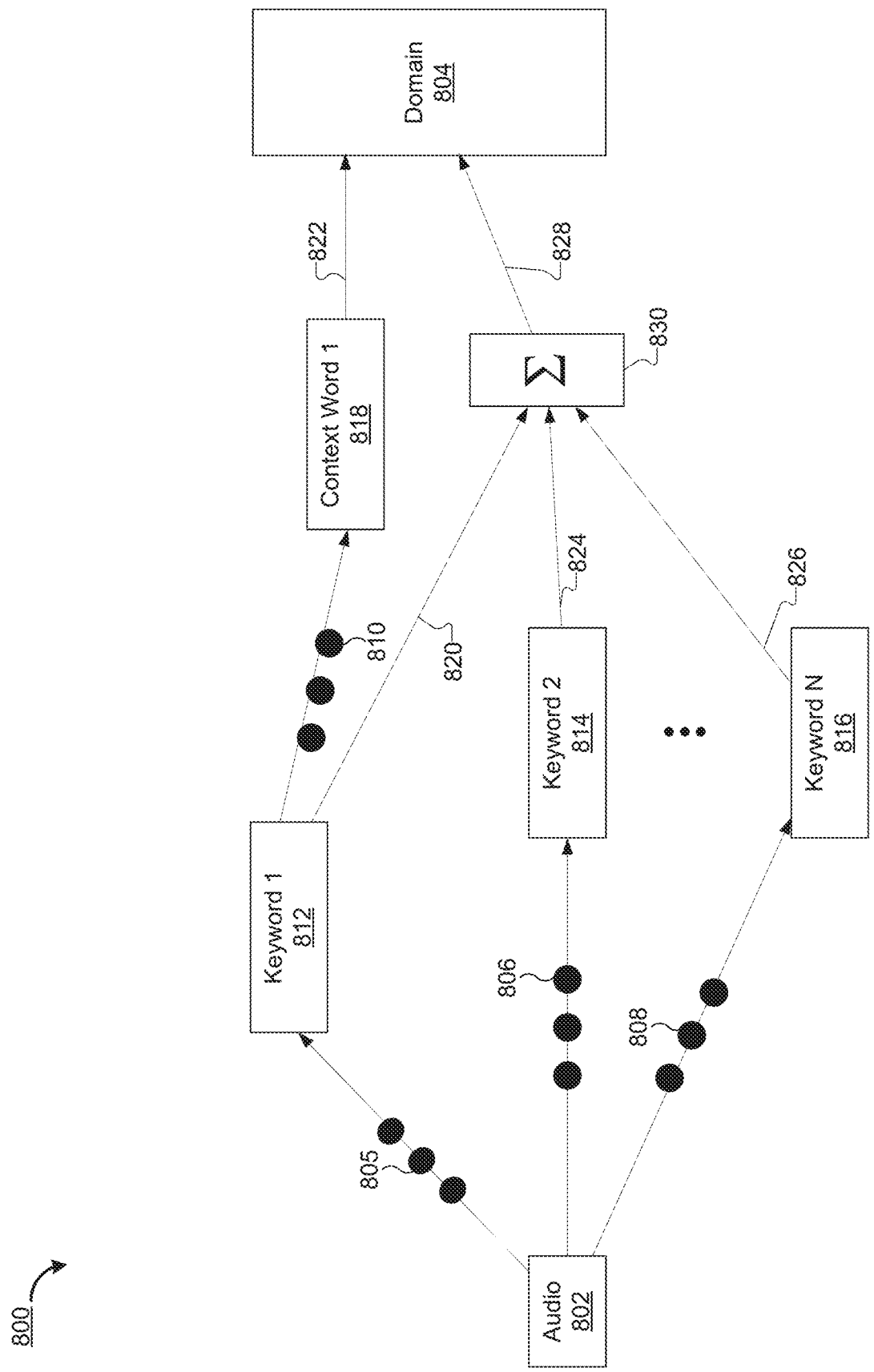
FIG. 8 illustrates a Bayesian methodology to determine a probability that an audio stream relates to a specific domain, in accordance with one or more embodiments of this disclosure.

FIG. 8 illustrates a Bayesian methodology 800 to interpret a probability that an audio stream 802 (e.g., buffered audio stored within second buffer 323b of FIG. 3) relates to a specific domain 804, in accordance with one or more embodiments of this disclosure. The Bayesian methodology 800 can be implemented by AMCA 340 of FIG. 3 (or AMCA 440 of FIG. 4). Although FIG. 8 shows an example of the Bayesian methodology 800 for a specific domain 804, it is understood that AMCA 340 of FIG. 3 (or AMCA 440 of FIG. 4 in a similar manner) can implement parallel (e.g., concurrent) instances of Bayesian methodology 800 for multiple domains, such as for each of domain(s) 508, 510, 512 stored in database 500 of FIG. 5. For example, if audio stream 802 contains a multi-domain keyword such as "hot," then AMCA 340 may implement an instance of Bayesian methodology 800 for weather domain 508 (represented by domain 804) and concurrently implement another instance of Bayesian methodology 800 for food domain 510 (represented by domain 804).

Keyword spotter 327 of AMCA 340 performs a keyword spotting process (which applies a Bayesian equation) on audio stream 802 and generates character strings 805-810 corresponding to the sounds within audio stream 802 that correlate to characters (i.e. letters, numbers, symbols). In generation of a character string, as AMCA 340 receives audio frames that compose audio stream 802, AMCA 340 matches the sound of each audio frame to a grapheme (i.e., single alphabet letter, digraph, etc.). For example, if AMCA 340 receives audio frames that contain sounds of the letter "h" followed audio frames that contain sounds of the letter "o" followed by audio frames that contain sounds of the letter "t," then AMCA 340 may generate a character string of "hhhooooottt." In performance of the keyword spotting process, AMCA 340 calculates a probability of keyword, given audio stream 802. That is, AMCA 340 generates a probabilistic output of how likely a particular keyword will be identified (e.g., spotted or accurately recognized) given audio stream 802 as input, which probability can be expressed according to Expression 1 below. AMCA 340 is able to recognize keywords and context words that are stored in database 500 of FIGS. 5 and 7B, based on various character strings 805-810 that form $keyword_1$-$keyword_N$ 812, 814, 816 and context words, such as $context\_word_1$ 818. For example, the AMCA 340 would recognize the keyword "hot" based on the generated character string of "hhhooooottt."

AMCA 340 initially detects $keyword_1$ 812 based on a determination that character string 805 spells or otherwise forms $keyword_1$ 812. For each $keyword_{i=1-N}$ that AMCA 340 detects, AMCA 340 calculates a probability according to Expression 1, where index i is an identifier of the keyword, as shown below:

$$P((keyword_i | audio)) \quad \text{[Expression 1]}$$

Also, for each $keyword_{i=1-N}$ that AMCA 340 detects, AMCA 340 calculates a probability that domain 804 will be identified given the $i^{th}$ keyword. More particularly, AMCA 340 calculates a probability that domain 804 is identified based on a portion of audio stream 802 (i.e., audio content that matches or otherwise contains only the $i^{th}$ keyword) as input. Such probability can be expressed according to Expression 2, and this probability can be the confidence weight assigned to each keyword in column 602 of table 600 of FIG. 6 regarding the domain 804. In Expression 2, probability of a domain (e.g., domain 804) given the $i^{th}$ keyword is as shown below:

$$P(domain | keyword_i) \quad \text{[Expression 2]}$$

Based on Expressions 1 and 2, by applying the Bayesian theorem, AMCA 340 generates a probability of a domain 804 given audio stream 802 for each $keyword_{i=1-N}$, as shown according to Expression 3 below.

$$P(domain | keyword_i) * P((keyword_i | audio)) \quad \text{[Expression 3]}$$

Iteratively, accumulating probabilities for each $keyword_{i=1-N}$, AMCA 340 calculates a final probability 828 that domain 804 will be identified given audio stream 802 as input. Such probability can be expressed according to Equation 1:

$$P(domain | audio) = \sum_{i}^{N} W_i * P(domain | keyword_i) * P((keyword_i | audio)) \quad \text{[Equation 1]}$$

In a non-limiting example, an adder 830 outputs probability 828 as being initially equal to probability 820, based on audio stream 802 containing initial $keyword_1$ 812. At this point, AMCA 340 may determine that probability 828 fails to meet acceptance criteria of domain 804. When audio stream 802 contains initial $keyword_1$ 812 and $keyword_2$ 814 in a time window, adder 830 outputs probability 828 as being equal to the sum of probability 820 and probability 824. At this later point in time, AMCA 340 determines that probability 828 fails to meet acceptance criteria of domain 804. When audio stream 802 contains initial $keyword_1$ 812, $keyword_2$ 814, and $keyword_N$ 816 in the same time window, adder 830 outputs probability 828 as being equal to the accumulated sum of probability 820, probability 824, and probability 826. At this time, AMCA 340 again compares probability 828 to acceptance criteria of domain 804. If this comparison yields that probability 828 does meet the acceptance criteria of domain 804, then AMCA 340 transmits a request (such as request 108 of FIG. 1) to a DS-ASR corresponding to domain 804. In such a case, for any other keyword, (i≠1, 2, or N) that is not detected in the audio stream 802, its probability given audio stream 802 is 0, such that $P((keyword_i | audio)) = 0$. Therefore, the non-detected keywords are not considered by adder 830 and do not contribute to the final probability 828 for that domain 804.

Alternatively, if this comparison yields that probability 828 fails to meet the acceptance criteria of domain 804, and if AMCA 340 determines that the audio length of audio stream 802 has reached a maximum length (i.e., exceeds a set limit) of the time window, then AMCA 340 updates the buffer. In updating the buffer, AMCA 340 applies a first-in-first-out (FIFO) method to discard keywords and context words from the buffered audio stream 802. That is, AMCA 340 removes initial keyword$_1$ 812 from audio stream 802, which creates space in the buffer for a new keyword or context word. Upon removing initial keyword$_1$ 812 from audio stream 802, AMCA 340 measures a new time window relative to keyword$_2$ 814, as the new first-in entry of the buffer.

In Equation 1, $W_i$ represents a manual enforcement value provided by a user. That is, a user (e.g., user 104 of FIG. 1) may particularly set user settings of AMCA 340 to pay more attention to or increase confidence weight assigned to certain keywords (i.e., keyword$_i$) in a specific domain. For example, user 104 may believe that the word "drizzle" is never used in natural language conversations about weather and only used in conversations about food. In order to instruct AMCA 340 to avoid identifying weather domain 508 of FIG. 5 and more likely identify food domain 510 of FIG. 5 when keyword "drizzle" is detected, user 104 can opt to set a manual enforcement value for keyword "drizzle" that is a low value (such as zero (0)) for the weather-domain and opt to set a manual enforcement value for keyword "drizzle" that is a value higher than 1.0 for the food-domain. The manual enforcement value then acts as a multiplier of the keyword's confidence weight in that specific domain, increasing or decreasing the confidence weight. With embodiments that operate using Equation 1, a default value of 1 is assigned as the manual enforcement value for all keyword confidence weights, until the manual enforcement value of a keyword is changed by the user. It is understood that $W_i$ is domain specific, i.e., different domains may have different manual enforcement values, $W_i$, for the same keyword$_i$. In Equation 1, $W_i$ has an index i that is linked to its corresponding keyword$_i$. In some embodiments, probability 820 represents the domain-specific confidence weight of keyword$_1$ 812 for domain 804. After the domain-specific confidence weight of the initial keyword (e.g., keyword$_1$ 812) is determined, AMCA 340 may compare domain-specific acceptance criteria to the probability 820 (i.e., P(domain|audio)). Given that audio stream 802 could represent different utterances from a user, each of probabilities 820, 822, 828 represents one alternative among multiple possible probabilities that could represent the probability (i.e., P(domain|audio)) that domain 804 is identified based on audio stream 802.

In another embodiment, once AMCA 340 detects the initial keyword$_1$ 812, then either a context word or subsequent keyword(s) can be detected in sequential order according to the order received through a microphone, such as microphone(s) 344 of FIG. 3. As a non-limiting example, microphone(s) 344 could receive the sounds according to character string 805 followed by character string 810. Accordingly, once initial keyword$_1$ 812 is detected, AMCA 340 detects context_word$_1$ 818 based on a determination that character string 810 spells or otherwise forms context_word$_1$ 818. As a context word can only be detected after detection of a keyword (which is not limited to the initial keyword), a context word may have an index i that is linked to its corresponding keyword, and an index j as an identifier of the context word itself. AMCA 340 calculates a probability of context_word$_1$ given audio stream 802. That is, AMCA 340 generates a probabilistic output of how likely a particular context_word$_1$ will be identified given audio stream 802 as input, which probability can be expressed as P((context_word$_{i,j}$|audio)). For each pairing of a context word (e.g., context_word$_1$ 818) within a same time window as a keyword (e.g., keyword$_1$ 812), AMCA 340 calculates a probability 822 that domain 804 will be identified given audio stream 802 (which contains the keyword/context-word pairing) as input. Probability 822 can be expressed according to Equation 2, where "domain" represents the relevant domain (e.g., domain 804):

$$P(\text{domain}|\text{audio}) = W_{i,j} P(\text{domain}|\text{keyword}_i, \text{context\_word}_{i,j}) * P((\text{keyword}_i|\text{audio})) * P((\text{context\_word}_{i,j}|\text{audio})) \quad [\text{Equation 2}]$$

where probability P(domain|keyword$_i$, context_word$_{i,j}$) represents the domain-specific enhanced confidence weight of the pairing of keyword$_1$ 812 and context_word$_1$ 818 for domain 804.

In Equation 2, $W_{i,j}$ represents a manual enforcement value provided by a user. That is, a user (e.g., user 104 of FIG. 1) may particularly set user settings of AMCA 340 to pay more attention to or increase enhanced confidence weight assigned to a certain pair of keywords (i.e., keyword) and context words (i.e., context_word$_{i,j}$) in a specific domain. For example, user 104 may believe that when the pair of keyword "raining" and context word "outside" are used in natural language conversations, the conversation is strongly related to a domain of "weather." In order to instruct AMCA 340 to identify weather domain 508 of FIG. 5 when keyword "raining" and context word "outside" are detected in audio stream 802, user 104 can opt to set a manual enforcement value higher than 1.0 for pair of keyword "raining" and context word "outside" to boost detection of the weather domain. The manual enforcement value then acts as a multiplier of the enhanced confidence weight in that specific domain, increasing or decreasing the enhanced confidence weight. With embodiments that operate using Equation 2, a default value of 1 is assigned as the manual enforcement value for enhanced confidence weights of all enhanced keyword/context_word pairs, until the manual enforcement value of a keyword/context_word pair is changed by the user. It is understood that $W_{i,j}$ is domain specific, i.e., different domains may have different manual enforcement values, $W_{i,j}$, for the pair of keyword, and context_word$_{i,j}$. In Equation 2, $W_{i,j}$ has an index i that is linked to a keyword$_i$ and an index j that is linked to a corresponding context_word$_{i,j}$ with respect to the keyword$_i$.

If AMCA 340 has only detected the pairing of keyword$_1$ 812 and context_word$_1$ 818, then the probability 822 that the keyword/context-word pairing is related to domain 804 is equal to the probability P(domain|audio) that domain 804 will be identified given the input of audio stream 802, as shown by Equation 2. In such a situation, AMCA 340 may compare domain-specific acceptance criteria to the results of Equation 2.

If the comparison of domain-specific acceptance criteria to the results of Equation 2 yields that probability 822 does meet the acceptance criteria of domain 804, then AMCA 340 transmits a request (such as request 108 of FIG. 1) to a DS-ASR corresponding to domain 804. Alternatively, if this comparison yields that probability 822 fails to meet the acceptance criteria of domain 804, and if AMCA 340 determines that the audio length (e.g., duration) of audio stream 802 has not reached a maximum length (i.e., does not exceeds a set limit) of the time window, then AMCA 340 continues receiving and saving audio frames in the buffer in order to determine whether additional keywords and context words can be detected in a time window measured relative to initial keyword$_1$ 812.

Figure 9:
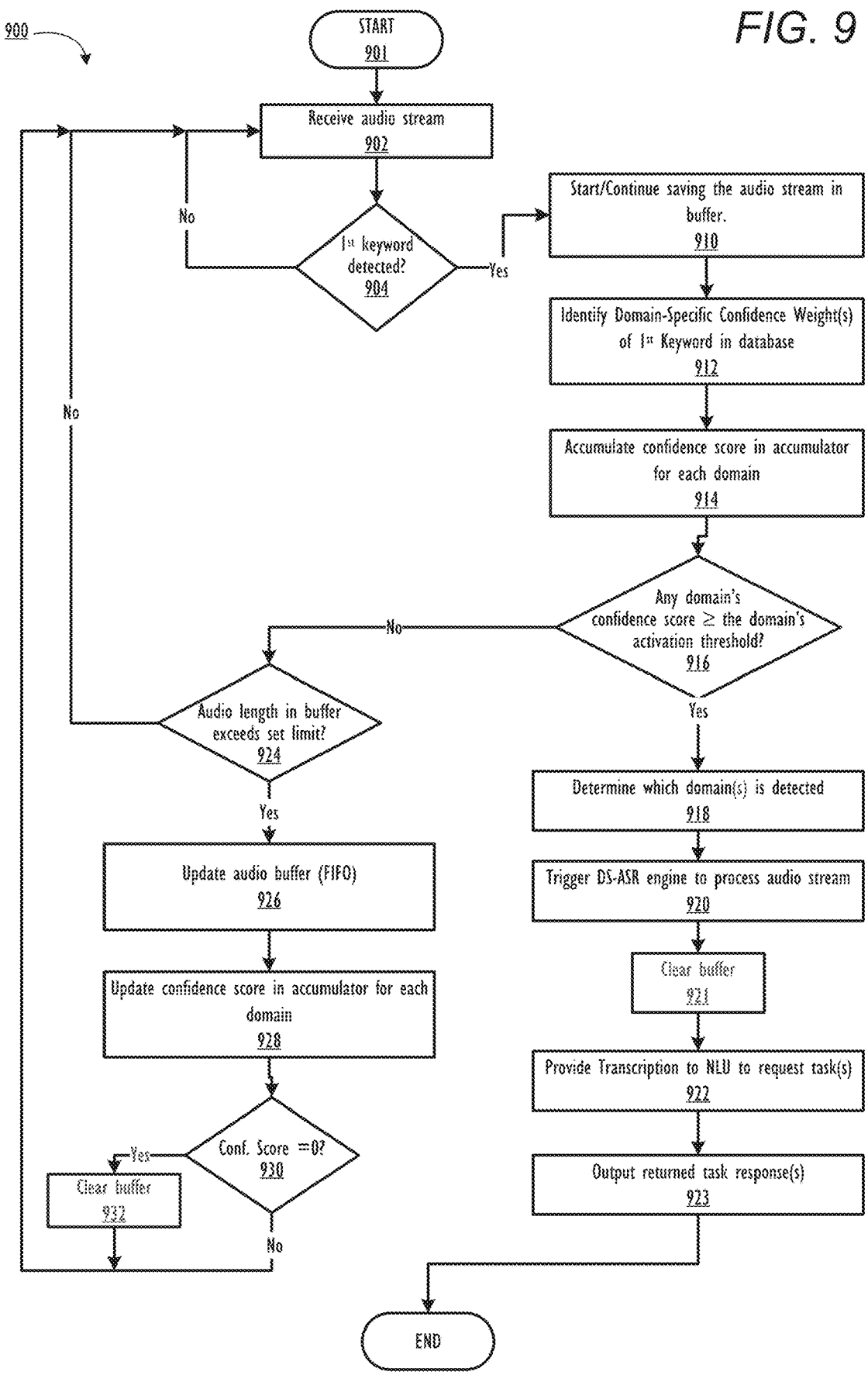
FIG. 9 provides a flowchart illustrating a method for operating an accumulative multi-cue activation (AMCA) process in accordance with one or more embodiments of this disclosure.

With reference now to FIG. 9, there is illustrated a flowchart illustrating a method 900 for operating an accumulative multi-cue activation (AMCA) module of a mobile device in accordance with one or more embodiments of this disclosure. Aspects of the method 900 are described with reference to the components of FIGS. 2 through 8. Several of the processes of the method provided in FIG. 9 can be implemented by a processor (e.g., processor(s) 305 of FIG. 1) executing software code of AMCA 340 within a data processing system (e.g., electronic device 100, DPS 300, or mobile device 400). The method processes described in FIG. 9 are generally described as being performed by AMCA 340, which is executed by processor and uses other components of DPS 300 or mobile device 400.

Method 900 commences at the start block 901, then proceeds to block 902. A block 902, AMCA 340 receives an audio stream from a microphone of an electronic device. For example, as shown in FIG. 3, DPS 300 includes microphone(s) 344 that receives an audio stream (such as audio stream 102 of FIG. 1). At decision block 904, AMCA 340 determines whether an initial/first keyword is detected. For example, keyword spotter 327 of AMCA 340 performs keyword spotting processes on audio stream 102 to recognize audio content that matches keywords stored in database 500 of FIG. 5. In response to a determination that no keyword is detected, method 900 returns to block 902. In response to a determination that an initial keyword is detected, method 900 proceeds to block 910. At block 910, AMCA 340 saves the audio stream in the buffer. According to one embodiment, the buffer is initially empty (or is emptied) prior to detecting the initial keyword. AMCA 340 starts saving the audio stream in the empty buffer or newly created buffer. In another embodiment, audio stream is continually saved or buffered for a preset time window, such that the buffer contains audio from before detection of a keyword and continues to store/buffer audio stream received after detection of the keyword. At block 912, AMCA 340 identifies domain-specific confidence weight(s) of the initial/first keyword in database 500.

At block 914, AMCA 340 accumulates one or more domain-specific confidence weight(s) into a domain-specific confidence score for each domain. Within block 914, AMCA 340 identifies each domain for which to accumulate a domain-specific confidence score, and thereby, AMCA 340 also determines whether to accumulate a domain-specific confidence score for one domain or multiple domains. For example, in embodiments where every keyword in database 500 is assigned a domain-specific confidence weight for each and every domain stored in the database 500, AMCA 340 accumulates a domain-specific confidence score for each and every domain. Alternatively, in embodiments where only domain(s) to which the keyword is sufficiently related are assigned a domain-specific confidence weight for the keyword, AMCA 340 accumulates a domain-specific confidence score for only those domains for which a domain-specific confidence weight is assigned to the initial/first keyword. More particularly, when a domain-specific confidence weight for multiple domains is assigned to the initial/fist keyword, AMCA 340 simultaneously accumulates a domain-specific confidence score for each of the multiple domains corresponding to the domain-specific confidence weights.

Figure 10:
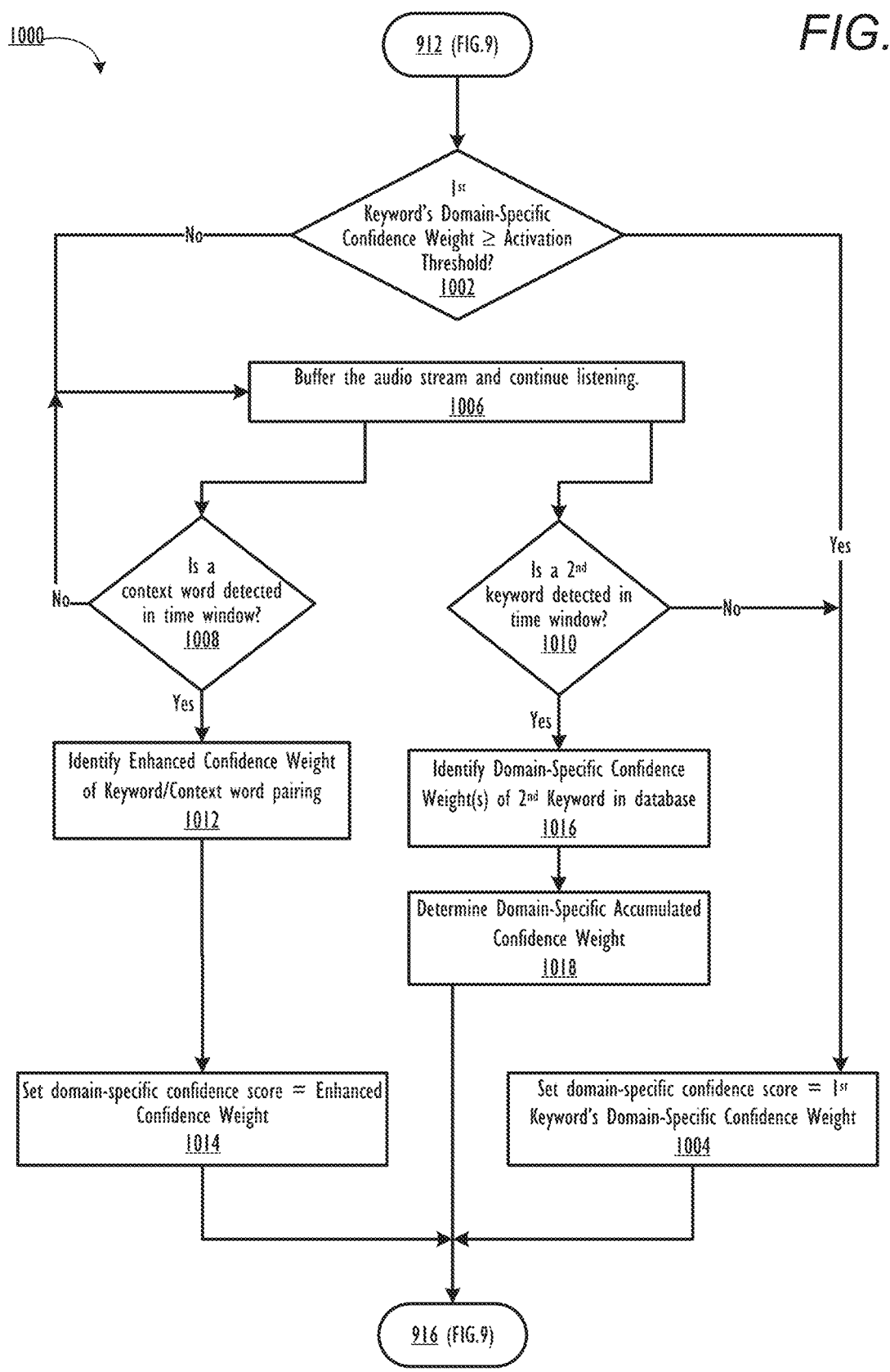
FIG. 10 provides a flowchart illustrating a method for determining an accumulated confidence score of a specific domain based on at least one keyword and context words of a specific domain, in accordance with one or more embodiments of this disclosure.
Figure 11:
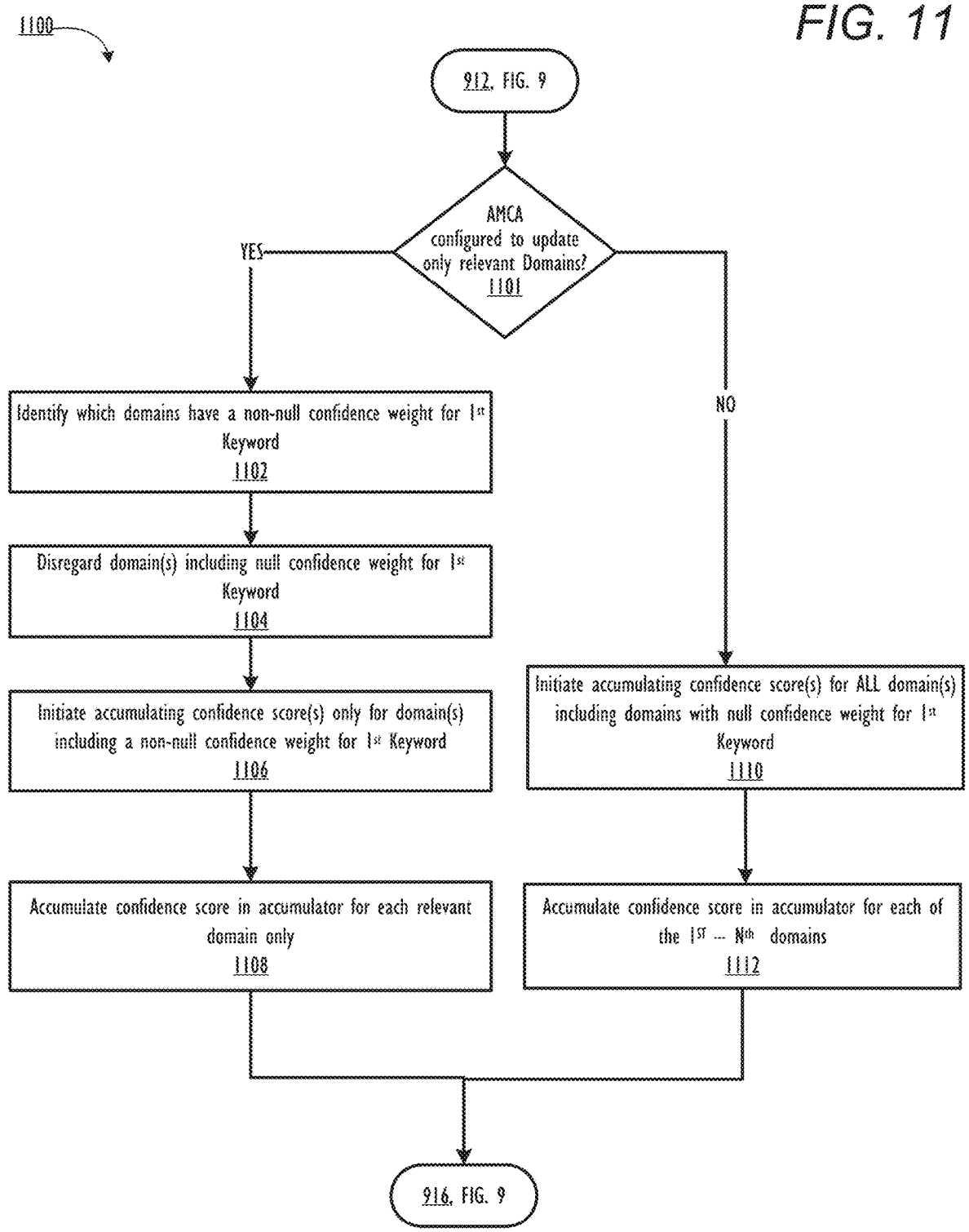
FIG. 11 provides a flowchart illustrating a method for concurrently determining an accumulated confidence score of multiple domains to which a keyword is related, in accordance with one or more embodiments of this disclosure.

As an example implementation of block 914, blocks 1101-1106 of method 1100 of FIG. 11 provides details of identifying for which domain(s) to accumulate a domain-specific confidence score. In response to a determination that a domain-specific confidence score will be accumulated for only one domain, AMCA 340 implements, for the one domain, an example implementation of block 914 shown as method 1000 of FIG. 10. Method 1000 of FIG. 10 (described below) provides details of determining an accumulated confidence score of one specific domain. In response to a determination that a domain-specific confidence score will be accumulated for multiple domains, AMCA 340 implements, for each domain, an example implementation of block 914 shown as method 1100 of FIG. 11. Method 1100 of FIG. 11 (described below) provides further details of determining an accumulated confidence score of multiple domains.

At decision block 916, AMCA 340 determines whether any domain-specific confidence score(s) (accumulated in block 914) meets a domain-specific acceptance criteria activation threshold. More particularly, AMCA 340 determines whether any domain-specific confidence score(s) (accumulated in block 914) are at least equal to an activation threshold value of the corresponding domain. In response to determining that at least one of the domain-specific confidence score(s) is at least equal to an activation threshold value of the corresponding domain, method 900 proceeds to block 918. In response to determining that none of domain-specific confidence score(s) are at least equal to an activation threshold value of the corresponding domain, method 900 proceeds to decision block 924.

At block 918, AMCA 340 determines which domain(s) is detected. As an example implementation of block 918, if multiple domain-specific confidence score(s) are at least equal to the activation threshold values of the corresponding domain, then AMCA 340 determines that each of the multiple corresponding domains are detected domains. As an alternative example implementation of block 918, if multiple domain-specific confidence score(s) are at least equal to the activation threshold values of the corresponding domain, then AMCA 340 selects one domain as the "detected domain," with selection of the specific domain based on one or more secondary factors (i.e., additional acceptance criterion). In one embodiment, the selection is based on a determination of which corresponding domain-specific confidence score was the earliest to meet or exceed the respective activation threshold value. In a second embodiment, the selection is based on a determination of which of the corresponding domain-specific confidence score is the highest value. As a third example implementation of block 918, if multiple domain-specific confidence score(s) are at least equal to the activation threshold values of the corresponding domain, then AMCA 340 selects one domain as the "detected domain," based on a determination of which domain has a highest calculated difference between the corresponding domain-specific confidence score and the corresponding activation threshold value for that domain.

At block 920, AMCA 340 triggers a corresponding DS-ASR engine to process the audio stream and generate a text format transcription of the audio stream. For example, AMCA 340 generates and sends an activation signal to the corresponding DS-ASR engine(s) 342, and in response, the corresponding DS-ASR engine(s) 342 transcribe the audio stream. The activation signal includes identification of selected domain(s), namely, the domain(s) detected at block 918. For example, the identification of selected domain(s) indicates which DS-ASR engine(s) 342A-342C of FIG. 3, if any, to activate for performing speech-to-text conversion processes on the audio stream. At block 921, AMCA 340 clears the buffer. By clearing the buffer, AMCA 340 resets the buffer for the restart of method 900 on a new audio stream.

At block 922, once the transcription is generated, AMCA 340 provides the transcription to an NLU system (e.g., NLU system 115 within electronic device 100) in order to request task(s) (e.g., request task of providing "weather conditions" at a time/location detected from speech, or request task of providing "kid's soccer schedule" status of a date detected from speech). The NLU system analyzes the transcription to determine user intent, generates a request for tasks based on the determined user intent, and transmits a request (e.g., request 108 of FIG. 1) to the computing cloud 110. The computing cloud 110 receives request 108 and returns response 116b that contains task responses 126 based on the request. At block 923, AMCA 340 outputs the task responses 126 within response 116 received from the application service 114 via computing cloud 110. For example, as shown in FIG. 1, task responses 126 are output as sounds 118 via a speaker (such as speakers 346 of FIG. 3).

At block 924, AMCA 340 determines whether an audio length of the audio stream saved in the buffer exceeds a set limit. That is, AMCA 340 determines whether the buffer is full. For example, the set limit may represent a predetermined maximum duration of time that is relative to a time that the earliest detected keyword saved in the buffer was received through microphones 344. In one embodiment, the buffer (i.e., second buffer 323b) is a first-in-first-out (FIFO) buffer, and the length of the audio stream saved in the buffer corresponds to an amount of time within a moving time window tracking the first-in portion of the audio stream and the last-in portion of the audio stream. The first-in portion of the buffer is the initial keyword, until the buffer updates (as described below with reference to block 926). In response to a determination that the buffer is full, method 900 proceeds to block 926. In response to a determination that the buffer is not full, method 900 returns to block 902 to continue listening to the audio stream in order to detect subsequent keywords or context words.

At block 926, method 900 includes automatically updating the audio buffer using FIFO ordering. That is, the storage controller or processor of the electronic device automatically discards the first-in portion of the audio stream that had been saved in the buffer as newer-in-time portions of the audio stream is received while the buffer is full. At block 928, AMCA 340 updates a confidence score in the accumulator for each domain. That is, for each of the domains for which AMCA 340 accumulated a confidence score at block 914, AMCA 340 reduces each of the confidence score of the domain by the discarded portion's confidence weight value. For example, if the buffer discards the keyword "hot," then the weather-domain confidence score is reduced by a value of 0.4 according to weather-domain confidence weights 602, and the food-domain confidence score is reduced by a value of 0.4 according to food-domain confidence weights 604.

At decision block 930, AMCA 340 determines whether the confidence score in the accumulator for each domain is equivalent to a zero (0) value. That is, confidence weight may become a zero value if a keyword with a low confidence weight (below the activation threshold) is detected, and then the set limit of the time window is exceeded before another keyword or context word is detected. In response to determining that the confidence score of each domain is equivalent to a zero (0) value, AMCA 340 clears the buffer at block 932. For example, in order to conserve computing resources, and to avoid saving audio in the buffer neverendingly, AMCA 340 clears the buffer if too much time (e.g., the set limit of the time window) has elapse since any keyword was detected (e.g., "heard"). Method 900 proceeds from block 932 to block 902 to resume listening in order to detect an initial keyword in a new audio stream. In response to determining that the confidence score of a least one domain is not equivalent to a zero (0) value, method 900 proceeds from block 930 to block 902 to continue listening in order to detect subsequent keywords for each domain with a non-zero confidence score.

With reference now to FIG. 10, there is illustrated a flowchart illustrating a method for determining an accumulated confidence score of a specific domain based on one or multiple keywords and context words of a specific domain, in accordance with one or more embodiments of this disclosure. Method 1000 can be an example implementation of block 914 of FIG. 9 by providing details of accumulating a domain-specific confidence score for each domain (namely, a single specific domain). For ease of explanation, method 1000 will be described as if applied to a single domain. It is understood that method 1000 can be simultaneously, but separately applied to any domain stored in database 500.

Method 1000 starts at decision block 1002, which continues from block 912 of FIG. 9. At block 1002, AMCA 340 receives an identification of domain(s) as being related to speech (e.g., speech 106 of FIG. 1) within audio stream 102 and determines whether the domain-specific confidence weight of the initial/first keyword is at least equal to the activation threshold value. In response to determining that domain-specific confidence weight of the initial/first keyword is at least equal to the activation threshold value, method 1000 proceeds to block 1004. Otherwise, method 1000 proceeds to block 1006. At block 1004, AMCA 340 sets the domain-specific confidence score equal to the domain-specific confidence weight of the initial/first keyword. Method 1000 proceeds from block 1004 to block 916 of FIG. 9. At block 1006, AMCA 340 continues listening and buffering the audio stream. Method 1000 proceeds from block 1006 to both block 1008 and block 1010, providing parallel processing for detection of subsequent keywords and detection of context word(s), respectively. At block 1008, AMCA 340 determines whether a context word is detected in a certain time window around a time the initial keyword was detected. The duration of the certain time window has a maximum limited set by the limit of the buffer. The certain time window is measured relative to a time of the initial/first keyword. In response to detecting a context word within the certain time window, the method proceeds to block 1012. When no context word is detected within the certain time window, method 1000 returns to block 1006. At block 1012, AMCA 340 identifies an enhanced confidence weight of a keyword/context-word pairing. For example, the keyword/context-word pairing is formed by the initial/first keyword (detected at block 904) and the context word (detected at block 1008). For example, the enhanced confidence weight of a keyword/context-word pairing can be identified from among the domain-specific enhanced confidence weights (e.g., 716) in database 500, as shown in FIG. 7C. At block 1014, AMCA 340 sets the domain-specific confidence score equal to the domain-specific enhanced confidence weight of the initial/first keyword. Method 1000 proceeds from block 1014 to block 916 of FIG. 9.

At block 1010, AMCA 340 determines whether at least one subsequent keyword is detected within a certain time window. For example, keyword spotter 327 of AMCA 340 performs a keyword spotting process on the audio stream to detect a subsequent keyword. At block 1010, AMCA 340 performs keyword spotting processes, similarly as performed at block 904 of FIG. 9, but uses the same time window as used in block 1008. In response to a determination that no subsequent keyword is detected within the time window, method 1000 proceeds to block 1004. In response to a determination that a subsequent keyword is detected, method 1000 proceeds to block 1016. At block 1016, AMCA 340 identifies domain-specific confidence weight(s) of the subsequent keyword in database 500. At block 1018, AMCA 340 determines a domain-specific accumulated confidence weight. Specifically, AMCA 340 adds the domain-specific confidence weight of the subsequent keyword(s) (identified at block 1016) to the domain-specific confidence weight of the immediately preceding keyword (identified at block 912). More particularly, AMCA 340 sets the domain-specific confidence score equal to the sum of the domain-specific confidence weights of the initial/first keyword and each of the subsequently keywords detected within the time window.

In some embodiments of method 1000, in response to determining that both the accumulated confidence weight (determined at block 1018) and the values of the enhanced confidence weight (determined at block 1012) are calculated, AMCA 340 sets the domain-specific confidence score equal to the sum of the accumulated confidence weight and the enhanced confidence weight. More particularly, if the audio stream captured within the time window includes all three of an initial keyword, a context word, and a subsequent keyword, then the domain-specific confidence score would be calculated. In some embodiments, the domain-specific confidence score would be calculated according to the sequence in which the words are spotted. For example, in case the audio stream includes a sequence of initial context-paired keyword followed by context word followed by subsequent keyword, then the domain-specific confidence score would be calculated as the sum of the enhanced confidence weight of the initial keyword and the non-enhanced confidence weight of the subsequent keyword. As a similar example, in case the audio stream includes a sequence of initial keyword followed by context word followed by subsequent context-paired keyword, then the domain-specific confidence score would be calculated as the sum of the non-enhanced confidence weight of the initial keyword and the enhanced confidence weight of the subsequent keyword. In alternative embodiments, the domain-specific confidence score would be calculated according to groupings of the words spotted. For example, in the alternative embodiments, the domain-specific confidence score according to groupings would be calculated as the sum of the accumulated confidence weight and the enhanced confidence weight.

With reference now to FIG. 11, there is illustrated a flowchart illustrating a method for determining an accumulated confidence score of multiple domains to which a keyword is related, in accordance with one or more embodiments of this disclosure. Method 1100 can be an example implementation of block 914 of FIG. 9 as method 1100 provides details of accumulating a domain-specific confidence score for each of multiple domains.

Method 1100 starts at block 1101 in which a determination is made of whether the AMCA 340 has been configured to accumulate confidence scores for only those select domains to which the first keyword is associated (i.e., keyword-based relevant domains). According to one aspect of the disclosure, AMCA 340 can be configured to concurrently process (via parallel processing) confidence scores for all of the domains or to process confidence scores for only those select domains which have a confidence weight associated with the first/initial keyword. In response to the AMCA 340 being configured to accumulate confidence scores for only relevant domains, method 1000 proceeds to block 1102, at which AMCA 340 identifies domains in database 500 that have a non-null domain-specific confidence weight assigned to the initial/first keyword. For example, as shown in FIG. 6, if the initial/first keyword is "hot," then AMCA 340 would identify both the weather domain and food domain as having real values (i.e., non-null values) assigned to the initial/first keyword. At block 1104, AMCA 340 disregards domains in database 500 that have a null value assigned for and/or do not include an entry for the initial/first keyword. For example, as shown in FIG. 6, if the initial/first keyword is "hot," then AMCA 340 identifies the sports domain as having a null value assigned to the initial/first keyword. At block 1106, AMCA 340 initiates accumulating the domain-specific confidence score for only those domains in which a real domain-specific confidence weight is assigned to the initial/first keyword. For example, as shown in FIG. 6, if the initial/first keyword is "hot," then AMCA 340 initiates accumulating a confidence score for both the weather domain and the food domain. However, AMCA 340 does not determine any domain-specific confidence score for the sports domain. That is, by only determining a domain-specific confidence score for the two out of three domains, AMCA 340 utilizes fewer computing resources than if all three domains had a domain-specific confidence score being concurrently determined. In this example, method 1100 would proceed from block 1106 to block 1108. At block 1108, AMCA 340 accumulates the domain-specific confidence score for both a first domain (for example, weather domain 508 of FIG. 5) and a second domain (for example, food domain 510 of FIG. 5) by concurrently performing method 1000 for each of the first and the second domains. The performance of the accumulation processes within each domain can occur concurrently, in parallel, or sequentially. Method 1100 then proceeds from block 1108 to block 916 of FIG. 9.

Returning to block 1101, in response to determining that the AMCA 340 is not configured to accumulate confidence scores for only relevant domains, i.e., AMCA 340 is configured to accumulate confidence scores for all domain, method 1000 proceeds to block 1110. At block 1110, AMCA 340 initiates accumulating confidence scores for all of the domains. At block 1112, AMCA 340 accumulates the domain-specific confidence score for each of the $1^{st}$ through $N^{th}$ domain by performing method 1000 for all domains. The performance of the accumulation processes within each domain can occur concurrently, in parallel, or sequentially. Method 1100 then proceeds from block 1112 to block 916 of FIG. 9.

In some embodiments of method 1100, decision block 1101 and left-side blocks 1102-1108 are optional and/or not implemented. In such embodiments, method 1100 proceeds directly to blocks 1110 and 1112, and AMCA 340 concurrently accumulates confidence weights into the domain-specific confidence score for each and every domain (namely, the first domain, second domain, and through the $N^{th}$ domain). For example, if the initial/first keyword is "hot," then AMCA 340 simultaneously proceeds to determine a domain-specific confidence score at all N domains.

With reference now to FIG. 2, an example scenario is presented in which a DS-ASR engine of electronic device 100 within the example ASR system is activated based on an accumulated confidence score meeting an activation threshold value of a specific domain, in accordance with one or more embodiments of this disclosure. The processes of example scenario 200 are generally described as being implemented by electronic device 100, which is understood to incorporate components of DPS 300 or mobile device 400. Electronic device 100 receives audio input from user 202 of the electronic device. User 202 speaks aloud to another person 204 the phrase "It's so hot!" In at least one embodiment, user 202 is a person having a voice profile (e.g., voiceprint) that is associated with and/or stored on the electronic device 100. The audio input 206 from user 202 is an audio stream that contains audio content 208 having a keyword "hot" that matches a similar keyword "hot" 710 stored in database 500.

In some embodiments, AMCA 340 will not perform domain-spotting methods 900-1100 of FIGS. 9-11, unless a known voice profile of user 202 is detected, which prevents the voice of another person 204 from initiating domain-spotting processes of AMCA 340. In response to determining that audio stream (within audio input 206) matches a known voice profile of user 202, AMCA 340 initiates keyword spotting on the audio stream (206) and on any other audio stream for a second entity (e.g., another person 204) that may be communicating with user 202.

Keyword spotter 327 of AMCA 340 detects an initial/first keyword "hot" by performing a keyword spotting process. Based on a determination that real confidence weights are assigned to keyword "hot" in both the weather and food domains, AMCA 340 activates and performs two simultaneous domain-spotting processes (i.e., method 1100 of FIG. 11). For example, AMCA 340 accumulates a confidence score for the weather domain (see block 1000 of FIG. 10) and accumulates a confidence score for the food domain (see block 1000 of FIG. 10). AMCA 340 sets both the weather-domain confidence score and the food-domain confidence score to "0.4" based on the multi-domain keyword "hot" being assigned a confidence weight 602 of "0.4" in both the weather-domain and the food-domain. AMCA 340 continues listening and buffering the audio stream since no acceptance criteria has been met at the time of assigning the initial confidence weights to the domains.

Next, mobile device 400 receives audio input from another person 204, who speaks aloud to user 202, the phrase "Yeah, must be over 100 degrees today!" The audio input 210a from another person 204 is an audio stream (considered a continuation of the audio stream (206)), which contains audio content 212 that includes keyword "degrees" that matches the keyword "degrees" stored in database 500. AMCA 340 saves audio input 210a in the FIFO buffer. At this point, the buffer includes an audio stream composed of audio input 206 followed by audio input 210a, within a same time window.

In some embodiments, audio input from another person 204 cannot initiate domain-spotting processes of AMCA 240. However, once AMCA 340 has initiated domain spotting methods 900-1100, audio input from another person 204 can be used by AMCA 340 to subsequently detect a context word or at least one subsequent keyword associated with the domains identified by the first keyword spoken by user 202.

AMCA 340 detects a subsequent or second keyword, "degrees", within audio input 210a by performing a keyword spotting process. Based on an identification of a real confidence weight assigned to keyword "degrees" in the weather domain, AMCA 340 performs the domain-spotting process (e.g., method 1000 of FIG. 10) of identifying which domain(s) is related to the audio stream composed of audio inputs 206 and 210a. AMCA 340 identifies the weather-domain confidence weight of "0.8" is assigned to the weather-domain keyword "degrees." AMCA 340 updates the weather domain confidence score by adding the weather-domain confidence weights of "0.8" of the subsequent/second keyword "degrees" and "0.4" of the initial/first keyword "hot" to generate a weather-domain accumulated confidence weight value of "1.2". AMCA 340 sends an activation signal to weather-domain DS-ASR engine 342A based on a determination that the weather-domain accumulated confidence weight value of "1.2" exceeds the weather-domain acceptance criteria (≥0.8). Weather-domain DS-ASR engine 342A activates and transcribes the audio stream (including audio inputs 206 and 210a) in response to being activated. AMCA 340 clears the FIFO buffer after NLU system 115 receives the transcription from DS-ASR engine 342A. Within electronic device 100, NLU system 115 determines user intent based on the transcription, and NLU system 115 generates request 214 that calls application service 114 to perform a task(s) based on the user intent. AMCA 340 causes DPS 300 to transmit a request 214 for weather conditions to computing cloud 110, which returns a response 218 with the weather conditions at a time/location detected from speech within the audio stream (including audio inputs 206 and 210a).

Concurrently, AMCA 340 determines no subsequent keyword is detected in relation to the food domain in the time window, based on a determination that food-related keywords 504 does not include "degrees." AMCA 340 maintains the confidence score in the accumulator for the food domain at the value of "0.4," which is less than the activation threshold value of the food domain. DS-ASR engine 342C remains in sleep mode, as the food domain is not detected based on the audio inputs 206 and 210a.

Alternatively, in the example scenario shown in FIG. 2, if mobile device 400 receives audio input from another person 204, who speaks aloud to user 202, the phrase "I told you. Don't grab stuff just coming out of the microwave." The audio input 210b from the other person 204 is an audio stream (considered a continuation of the audio stream (206)), which contains audio content that does not match keywords stored in database 500. AMCA 340 saves audio input 210b in the FIFO buffer. At this point, the buffer includes an audio stream composed of audio input 206 followed by audio input 210b, within a same time window. In accumulating the confidence scores for the food domain and the weather domain, AMCA 340 determines no subsequent keyword is detected in the time window. AMCA 340 maintains the confidence weight for the food domain at a value of "0.4," which is less than the activation threshold values of the food domain (i.e., 0.7) and the weather domain (i.e., 0.8). DS-ASR engines 342 remain in sleep mode, as no domain is detected based on the audio inputs 202 and 210b. That is, AMCA 340 does not generate nor transmit any request to the computing cloud 110.

In the above-described flowcharts of FIGS. 9-11, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
receiving an audio stream from a microphone of an electronic device;
detecting an initial keyword within the audio stream, the initial keyword being stored in a database comprising multiple keywords, each of the multiple keywords being related to at least one of multiple domains stored in the database, the database storing a first confidence weight for each of the multiple keywords that are related to a first domain among the at least one of multiple domains, each first confidence weight indicating a probability that a corresponding keyword relates to the first domain;
identifying, in the database, a first confidence weight of the initial keyword;
determining, by a processor, whether the first confidence weight of the initial keyword is at least equal to an activation threshold value associated with the first domain;
in response to determining that the first confidence weight of the initial keyword is at least equal to the activation threshold value, activating a domain-specific automatic speech recognition (DS-ASR) engine corresponding with the first domain to perform speech-to-text conversion on the audio stream.

2. The method of claim 1, further comprising, in response to determining that the first confidence weight of the initial keyword is less than the activation threshold value:
buffering the audio stream over a time window;
detecting, within the time window, a context word within the audio stream, the time window being a predetermined duration that is relative to a time of the initial keyword;
identifying, in the database, an enhanced confidence weight of a pairing of the initial keyword with the context word, the database storing an enhanced confidence weight for each context-paired keyword from among the multiple keywords, each enhanced confidence weight indicating a probability that the pairing relates to the first domain;

comparing the enhanced confidence weight to the activation threshold value;
in response to determining that the enhanced confidence weight is at least equal to the activation threshold value, activating the DS-ASR engine corresponding with the first domain to perform speech-to-text conversion on the buffered audio stream.

3. The method of claim 1, further comprising, in response to determining that the first confidence weight of the initial keyword is less than the activation threshold value:
buffering the audio stream over a time window;
detecting, within the time window, at least one subsequent keyword within the audio stream, the time window being a predetermined duration that is relative to a time of the initial keyword;
identifying, in the database, a first confidence weight of each of the at least one subsequent keyword;
determining an accumulated confidence weight using the first confidence weights of the initial keyword and each of the at least one subsequent keyword;
comparing the accumulated confidence weight to the activation threshold value;
in response to determining that the accumulated confidence weight is at least equal to the activation threshold value, activating the DS-ASR engine corresponding with the first domain to perform speech-to-text conversion on the buffered audio stream.

4. The method of claim 1, further comprising, in response to determining that the first confidence weight of the initial keyword is less than the activation threshold value:
buffering the audio stream over a time window;
detecting, within a first time window, a second keyword within the audio stream, the first time window being a predetermined duration that is relative to a time of the initial keyword;
identifying, in the database, a first confidence weight of the second keyword;
iteratively determining an accumulated confidence weight until the accumulated confidence weight is at least equal to the activation threshold value, by:
adding the first confidence weight of the initial keyword to the first confidence weight of the second keyword as the accumulated confidence weight for the first time window;
in response to determining that a sum of first confidence weights for a current time window is less than the activation threshold value:
detecting, within a subsequent time window, a subsequent keyword within the audio stream, the subsequent time window being a predetermined duration that is relative to a time of an immediately preceding keyword;
identifying, in the database, a first confidence weight of the subsequent keyword;
adding the sum of the first confidence weights of the current time window to the first confidence weight of the subsequent keyword as the accumulated confidence weight for the subsequent time window;
in response to determining that the accumulated confidence weight is at least equal to the activation threshold value, activating the DS-ASR engine corresponding with the first domain to perform speech-to-text conversion on the buffered audio stream.

5. The method of claim 1, wherein:
each of the multiple keywords have at least a first confidence weight and a second confidence weight stored in the database, the first confidence weight indicating a probability that the audio stream relates to the first domain, the second confidence weight indicating a probability that the audio stream relates to a second domain; and
the method further comprises:
identifying, in the database, a second confidence weight of the initial keyword;
determining whether the second confidence weight of the initial keyword is at least equal to a second activation threshold value associated with the second domain;
in response to determining that the second confidence weight of the initial keyword is at least equal to the second activation threshold value, activating the DS-ASR engine corresponding with the second domain to perform speech-to-text conversion on the audio stream.

6. The method of claim 5, further comprising, in response to determining that the first confidence weight of the initial keyword is less than an activation threshold associated with the first domain and the second confidence weight of the initial keyword is less than the second activation threshold value:
buffering the audio stream;
detecting, within a first time window, a second keyword within the audio stream, the first time window being a predetermined duration that is relative to a time of the initial keyword;
identifying, in the database, a first confidence weight and second confidence weight of the second keyword;
simultaneously determining an accumulated confidence weight of the first domain and an accumulated confidence weight of the second domain until one of: the accumulated confidence weight of the first domain is at least equal to the activation threshold value associated with the first domain or the accumulated confidence weight of the second domain is at least equal to the second activation threshold value.

7. The method of claim 6, further comprising, in response to determining that the accumulated confidence weight of the first domain is less than the activation threshold of the first domain and the accumulated second confidence weight of the second domain is less than the second activation threshold value of the second domain:
iteratively determining, for each of a sequence of one or more subsequent time windows, a new accumulated confidence weight of each of the first and second domains until the accumulated confidence weight of one of the first and the second domains is at least equal to the activation threshold value of a respective one of the first and the second domain, each subsequent time window being a predetermined duration that extends from a time of an immediately preceding keyword; and
in response to determining that the accumulated confidence weight of one of the first and the second domains is at least equal to the activation threshold value for the respective one of the first and the second domains, activating the DS-ASR engine corresponding with the respective one of the first and the second domains to perform speech-to-text conversion on the audio stream.

8. An electronic device comprising:
at least one microphone that receives an audio stream;
a memory storing a multi-cue activation module that, based on a determination the audio stream relates to a first domain, activates a domain-specific automatic speech recognition (DS-ASR) engine to perform speech-to-text conversion on the audio stream;

an output device;
a processor coupled to the at least one microphone, the memory, and the output device, and which executes the multi-cue activation module that enables the electronic device to:
  detect an initial keyword within the audio stream, the initial keyword being stored in a database comprising multiple keywords, each of the multiple keywords being related to at least one of multiple domains stored in the database, the database storing a first confidence weight for each of the multiple keywords that are related to a first domain among the at least one of multiple domains, each first confidence weight indicating a probability that a corresponding keyword relates to the first domain;
  identify, in the database, a first confidence weight of the initial keyword, the first confidence weight indicating a probability that the audio stream relates to the first domain;
  determine whether the first confidence weight of the initial keyword is at least equal to an activation threshold value;
  in response to determining that the first confidence weight of the initial keyword is at least equal to the activation threshold value, activate the DS-ASR engine corresponding with the first domain to perform speech-to-text conversion on the audio stream.

9. The electronic device of claim 8, wherein the multi-cue activation module further enables the electronic device to, in response to determining that the first confidence weight of the initial keyword is less than the activation threshold value:
  buffer a time window of the audio stream received via the at least one microphone;
  detect, within the time window, a context word within the audio stream, the time window being a predetermined duration that is relative to a time of the initial keyword;
  identify, in the database, an enhanced confidence weight of a pairing of the initial keyword with the context word, the database storing an enhanced confidence weight for each context-paired keyword from among the multiple keywords, each enhanced confidence weight indicating a probability that the pairing relates to the first domain;
  compare the enhanced confidence weight to the activation threshold value; and
  in response to determining that the enhanced confidence weight at is at least equal to the activation threshold value, speech-to-text conversion activating a domain-specific automatic speech recognition (DS-ASR) engine corresponding with the first domain to perform speech-to-text conversion on the buffered audio stream.

10. The electronic device of claim 8, wherein the multi-cue activation module further enables the electronic device to in response to determining that the first confidence weight of the initial keyword does not meet an activation criteria:
  buffer a time window of the audio stream;
  detect, within the time window, at least one subsequent keyword within the audio stream, the time window being a predetermined duration that is relative to a time of the initial keyword;
  identify, in the database, a first confidence weight of each of the at least one subsequent keyword;
  determine an accumulated confidence weight using the first confidence weights of the initial keyword and each of the at least one subsequent keyword;
  compare the accumulated confidence weight to the activation threshold value;
  in response to determining that the accumulated confidence weight is at least equal to the activation threshold value, speech-to-text conversion activating a domain-specific automatic speech recognition (DS-ASR) engine corresponding with the first domain to perform speech-to-text conversion on the buffered audio stream.

11. The electronic device of claim 8, wherein the multi-cue activation module further enables the electronic device to in response to determining that the first confidence weight of the initial keyword is less than the activation threshold value:
  buffer the audio stream;
  detect, within a first time window, a second keyword within the audio stream, the first time window being a predetermined duration that is relative to a time of the initial keyword;
  identify, in the database, a first confidence weight of the second keyword;
  iteratively determine an accumulated confidence weight until the accumulated confidence weight is at least equal to the activation threshold value, by:
    adding the first confidence weight of the initial keyword to the first confidence weight of the second keyword as the accumulated confidence weight for the first time window;
    in response to determining that a sum of the first confidence weights for a current time window is less than the activation threshold value:
      detecting, within a subsequent time window, a subsequent keyword within the audio stream, the subsequent time window being a predetermined duration that is relative to a time of an immediately preceding keyword;
      identifying, in the database, a first confidence weight of the subsequent keyword;
      adding the sum of the first confidence weights of the current time window to the first confidence weight of the subsequent keyword as the accumulated confidence weight for the subsequent time window;
  in response to determining that the accumulated confidence weight is at least equal to the activation threshold value, speech-to-text conversion activating a domain-specific automatic speech recognition (DS-ASR) engine corresponding with the first domain to perform speech-to-text conversion on the buffered audio stream.

12. The electronic device of claim 8, wherein:
each of the multiple keywords have at least a first confidence weight and a second confidence weight stored in the database, the first confidence weight indicating a probability that the audio stream relates to the first domain, the second confidence weight indicating a probability that the audio stream relates to a second domain; and
the multi-cue activation module further enables the electronic device to:
  identify, in the database, a second confidence weight of the initial keyword;
  determine whether the second confidence weight of the initial keyword is at least equal to a second activation threshold value associated with the second domain;
  in response to determining that the second confidence weight of the initial keyword is at least equal to the second activation threshold value, speech-to-text conversion activating a domain-specific automatic speech recognition (DS-ASR) engine corresponding with the second domain to perform speech-to-text conversion on the audio stream.

13. The electronic device of claim 12, wherein the multi-cue activation module further enables the electronic device to, in response to determining that the first confidence weight of the initial keyword is less than an activation threshold associated with the first domain and the second confidence weight of the initial keyword is less than the second activation threshold value:
buffer the audio stream;
detect, within a first time window, a second keyword within the audio stream, the first time window being a predetermined duration that is relative to a time of the initial keyword;
identify, in the database, a first confidence weight and second confidence weight of the second keyword;
simultaneously determine an accumulated confidence weight of the first domain and an accumulated confidence weight of the second domain until one of: the accumulated confidence weight of the first domain is at least equal to the activation threshold value associated with the first domain or the accumulated confidence weight of the second domain is at least equal to the second activation threshold value.

14. The electronic device of claim 13, wherein the multi-cue activation module further enables the electronic device to in response to determining that the accumulated confidence weight of the first domain is less than the activation threshold of the first domain and the accumulated second confidence weight of the second domain is less than the second activation threshold value of the second domain:
iteratively determine, for each of a sequence of one or more subsequent time windows, a new accumulated confidence weight of each of the first and second domains until the accumulated confidence weight of one of the first and the second domains is at least equal to the activation threshold value of a respective one of the first and the second domain, each subsequent time window being a predetermined duration that extends from a time of an immediately preceding keyword; and
in response to determining that the accumulated confidence weight of one of the first and the second domains is at least equal to the activation threshold value for the respective one of the first and the second domains, speech-to-text conversion activating the DS-ASR engine corresponding with the respective one of the first and the second domains to perform speech-to-text conversion on the audio stream.

15. A computer program product comprising:
a non-transitory computer readable storage device;
program code on the computer readable storage device that when executed by a processor associated with an electronic device, the program code enables the electronic device to provide the functionality of:
receiving an audio stream from a microphone of the electronic device;
detecting an initial keyword within the audio stream, the initial keyword being stored in a database comprising multiple keywords, each of the multiple keywords being related to at least one of multiple domains stored in the database, the database storing a first confidence weight for each of the multiple keywords that are related to a first domain among the at least one of the multiple domains, each first confidence weight indicating a probability that a corresponding keyword relates to the first domain;
identifying, in the database, a first confidence weight of the initial keyword, the first confidence weight indicating a probability that the audio stream relates to the first domain;
determine whether the first confidence weight of the initial keyword is at least equal to an activation threshold value;
in response to determining that the first confidence weight of the initial keyword is at least equal to the activation threshold value, speech-to-text conversion activating a domain-specific automatic speech recognition (DS-ASR) engine corresponding with the first domain to perform speech-to-text conversion on the audio stream.

16. The computer program product of claim 15, wherein the program code further enables the electronic device to provide the functionality of in response to determining that the first confidence weight of the initial keyword is less than the activation threshold value:
buffering, over a time window, the audio stream received via the at least one microphone;
detecting, within the time window, a context word within the audio stream, the time window being a predetermined duration that is relative to a time of the initial keyword;
identifying, the database, an enhanced confidence weight of a pairing of the initial keyword with the context word, the database storing an enhanced confidence weight for each context-paired keyword from among the multiple keywords, each enhanced confidence weight indicating a probability that the pairing relates to the first domain;
comparing the enhanced confidence weight to the activation threshold value; and
in response to determining that the enhanced confidence weight is at least equal to the activation threshold value, speech-to-text conversion activating the DS-ASR engine corresponding with the first domain to perform speech-to-text conversion on the buffered audio stream.

17. The computer program product of claim 15, wherein the program code further enables the electronic device to provide the functionality of in response to determining that the first confidence weight of the initial keyword does not meet an activation criteria:
buffering the audio stream over a time window;
detecting, within the time window, at least one subsequent within the audio stream, the time window being a predetermined duration that is relative to a time of the initial keyword;
identifying, in the database, a first confidence weight of each of the at least one subsequent keyword;
determining an accumulated confidence weight using the confidence weights of the initial keyword and each of the at least one subsequent keyword;
comparing the accumulated confidence weight to the activation threshold value;
in response to determining that the accumulated confidence weight is at least equal to the activation threshold value, speech-to-text conversion activating the DS-ASR engine corresponding with the first domain to perform speech-to-text conversion on the buffered audio stream.

18. The computer program product of claim 15, wherein:
each of the multiple keywords have at least a first confidence weight and a second confidence weight stored in the database, the first confidence weight indicating a probability that the audio stream relates to the first domain, the second confidence weight indicating a probability that the audio stream relates to a second domain; and the program code further enables the electronic device to provide the functionality of:

identifying, the database, a second confidence weight of the initial keyword;

determining whether the second confidence weight of the initial keyword is at least equal to a second activation threshold value associated with the second domain;

in response to determining that the second confidence weight of the initial keyword is at least equal to the second activation threshold value, speech-to-text conversion activating the DS-ASR engine corresponding with the second domain to perform speech-to-text conversion on the audio stream.

19. The computer program product of claim 18, wherein the program code further enables the electronic device to provide the functionality of, in response to determining that the first confidence weight of the initial keyword is less than an activation threshold associated with the first domain and the second confidence weight of the initial keyword is less than the second activation threshold value:

buffering the audio stream;

detecting, within a first time window, a second keyword within the audio stream, the first time window being a predetermined duration that is relative to a time of the initial keyword;

identifying, in the database, a first confidence weight and second confidence weight of the second keyword;

simultaneously determining an accumulated confidence weight of the first domain and an accumulated confidence weight of the second domain until one of: the accumulated confidence weight of the first domain is at least equal to the activation threshold value associated with the first domain or the accumulated confidence weight of the second domain is at least equal to the second activation threshold value.

20. The computer program product of claim 19, wherein the program code further enables the electronic device to provide the functionality of in response to determining that the accumulated confidence weight of the first domain is less than the activation threshold of the first domain and the accumulated second confidence weight of the second domain is less than the second activation threshold value of the second domain:

iteratively determining, for each of a sequence of one or more subsequent time windows, a new accumulated confidence weight of each of the first and second domains until the accumulated confidence weight of one of the first and the second domains is at least equal to the activation threshold value of the respective one of the first and the second domain, each subsequent time window being a predetermined duration that extends from a time of an immediately preceding keyword; and in response to determining that the accumulated confidence weight of one of the first and the second domains is at least equal to the activation threshold value for the respective one of the first and the second domains, speech-to-text conversion activating the DS-ASR engine corresponding with the respective one of the first and the second domains to perform speech-to-text conversion on the audio stream.

* * * * *